US008756525B2

(12) United States Patent
Sasaki

(10) Patent No.: US 8,756,525 B2
(45) Date of Patent: Jun. 17, 2014

(54) METHOD AND PROGRAM FOR DISPLAYING INFORMATION AND INFORMATION PROCESSING APPARATUS

(75) Inventor: Toru Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 11/581,649

(22) Filed: Oct. 16, 2006

(65) Prior Publication Data
US 2007/0094611 A1    Apr. 26, 2007

(30) Foreign Application Priority Data

Oct. 24, 2005   (JP) .............................. JP2005-308492

(51) Int. Cl.
*G06F 3/048*   (2013.01)

(52) U.S. Cl.
USPC ............ 715/804; 715/805; 715/822; 715/838

(58) Field of Classification Search
USPC .................................. 715/804, 805, 822, 838
See application file for complete search history.

(56) References Cited

U.S. PATENT DOCUMENTS

| | | | | |
|---|---|---|---|---|
| 5,754,179 A | * | 5/1998 | Hocker et al. ................. | 715/835 |
| 5,920,313 A | * | 7/1999 | Diedrichsen et al. ......... | 715/767 |
| 6,160,553 A | * | 12/2000 | Robertson et al. ............ | 715/767 |
| 6,693,652 B1 | * | 2/2004 | Barrus et al. .................. | 715/838 |
| 7,130,846 B2 | | 10/2006 | Danker et al. | |
| 7,383,503 B2 | * | 6/2008 | Banks ........................... | 715/273 |
| 7,434,172 B1 | * | 10/2008 | Christensen et al. ......... | 715/772 |
| 2002/0044128 A1 | | 4/2002 | Hayashi et al. | |
| 2006/0112335 A1 | * | 5/2006 | Hofmeister et al. .......... | 715/701 |

FOREIGN PATENT DOCUMENTS

| | | |
|---|---|---|
| CN | 1321928 A | 11/2001 |
| CN | 1 573 664 A | 2/2005 |
| JP | 2001-312409 A | 11/2001 |
| JP | 2004-30145 A | 1/2004 |
| JP | 2004-192355 A | 7/2004 |

* cited by examiner

*Primary Examiner* — Amy Ng
*Assistant Examiner* — Sajeda Muhebbullah
(74) *Attorney, Agent, or Firm* — Wolf, Greenfield & Sacks, P.C.

(57) ABSTRACT

An information processing apparatus includes a display unit configured to display a plurality of display information items, each corresponding to a content item, and an indicator for indicating one of the display information items, an operation unit, and a control unit. The control unit receives an instruction for updating the display position of the indicator. When the indicator indicates and selects one of the display information items on the display unit, the control unit determines a relationship between the display information item indicated and selected by the indicator and the display information items other than the display information item selected by the indicator and displays the relationship between the display information item selected by the indicator and the display information item determined to have a relationship with the display information item selected by the indicator among the display information items other than the display information item selected by the indicator.

11 Claims, 15 Drawing Sheets

METHOD AND PROGRAM FOR DISPLAYING INFORMATION AND INFORMATION PROCESSING APPARATUS

CROSS REFERENCES TO RELATED APPLICATIONS

The present application claims priority under 35 U.S.C. §119 to Japanese Patent Application JP 2005-308492, filed in the Japanese Patent Office on Oct. 24, 2005, the entire contents of which are incorporated herein by reference.

BACKGROUND OF THE INVENTION

1. Field of the Invention

The present invention relates to an apparatus, such as a personal computer, a mobile device, and a game machine, capable of displaying a variety of data via a display element (display unit) and to a method and a program for displaying such data in the apparatus.

2. Description of the Related Art

High-capacity recording media, such as digital versatile discs (DVDs) and compact hard disks, have become widespread. In addition, wide-area networks (such as the Internet) have been used at relatively low cost. Accordingly, individuals can use a large amount of various information.

Therefore, a variety of technologies for efficiently using a variety of available information have been developed. In particular, technologies for associating data related to each other and data having a relationship have been developed. For example, Japanese Unexamined Patent Application Publication No. 2004-030145 describes technology that improves the ease of use of a so-called bookmark function that stores uniform resource locators (URLs) of frequently accessed web sites.

According to the technology described in Japanese Unexamined Patent Application Publication No. 2004-030145, a reduced image of a frequently accessed web page can be generated. After a reduced image known as a thumbnail image is generated, this image can be associated with the corresponding URL and can be stored. In this technology, a plurality of the stored thumbnail images are displayed in the form of a list. A user can rapidly and reliably searches for and accesses a desired web site using the displayed thumbnail images.

Thus, the technology described in Japanese Unexamined Patent Application Publication No. 2004-030145 can manage a thumbnail image generated by reducing the image of a web page in association with the URL thereof. Therefore, the user can select a frequently accessed web site from among a variety of web sites via the thumbnail images. By selecting a thumbnail image, the user can rapidly and reliably uses a frequently accessed web site. In this way, the technology described in Japanese Unexamined Patent Application Publication No. 2004-030145 provides one possibility to facilitate the usage of a variety of available information.

SUMMARY OF THE INVENTION

In the technology described in Japanese Unexamined Patent Application Publication No. 2004-030145, a URL associated with a thumbnail image is used for accessing the corresponding web site. Since, unlike a thumbnail image, a URL does not provide much information to a user, the need for presenting the URL to the user is small. Accordingly, the URL can be managed in association with the thumbnail image so as to be used only when the web site is accessed.

However, like the thumbnail, some data managed in association with the thumbnail may provide much information to users. For example, text information relating to the thumbnail image can be managed in association with the thumbnail image. In personal computers, when a user carries out a predetermined operation on a displayed thumbnail image, text information relating to the thumbnail image is usually displayed. One example of the text information relating to a thumbnail image is the annotation of the thumbnail image.

As noted above, in some cases, one of two related information items is main information and the other is sub information. In such cases, it is effective that an apparatus displays the main information at all times, but displays the sub information as needed. However, if the two related information items are main information items, users desire to view the two information items at the same time. Also, the users desire that related data in two information group are displayed so that the users can easily recognize the relationship.

Accordingly, the present invention allows a user to view a plurality of display information items on one screen at the same time. Additionally, the present invention clearly indicates the presence of a relationship between display information items.

According to one embodiment of the present invention, an information processing apparatus includes a display unit configured to display a plurality of display information items, each corresponding to a content item, and an indicator for indicating one of the display information items, an operation unit, and a control unit. The control unit receives an instruction of updating the display position of the indicator. When the indicator indicates and selects one of the plurality of display information items on the display unit, the control unit determines a relationship between the display information item indicated and selected by the indicator and a plurality of the display information items other than the display information item indicated and selected by the indicator and displays the relationship between the display information item indicated and selected by the indicator and the display information item determined to have a relationship with the display information item indicated and selected by the indicator among the plurality of display information items other than the display information item indicated and selected by the indicator.

In the information processing apparatus, when a plurality of display information items and an indicator for indicating one of the plurality of display information items are displayed on the display unit, the display position of the indicator is moved in response to an instruction via the operation unit. When the indicator is placed on one of the display information items in order to indicate and select the display information item, the control unit determines the relationship among the plurality of the display information items.

That is, the control unit determines the relationship between the display information item indicated and selected by the indicator and the plurality of the display information items other than the display information item indicated and selected by the indicator. Subsequently, the control unit displays a link between the display information item indicated and selected by the indicator and the display information item determined to have a relationship with the display information item indicated and selected by the indicator.

Accordingly, when important related display information items are displayed in one screen, the correspondence between the related display information items can be clearly displayed in response to a user instruction. As a result, the user can clearly recognize the correspondence between the related display information items among the plurality of important display information items in one screen.

DESCRIPTION OF THE PREFERRED EMBODIMENTS

An apparatus, a method, and a program according to exemplary embodiments of the present invention are described below with reference to the accompanying drawings. The present invention is applicable to a variety of information processing apparatuses that are capable of displaying a variety of information via display elements. Examples of information processing apparatuses that are capable of displaying a variety of information via display elements include a personal computer, a mobile information device, a cell phone, and a game machine. For simplicity, hereinafter, description is made with reference to a home server to which the present invention is applied.

Configuration of Information Processing Apparatus

Figure 1:
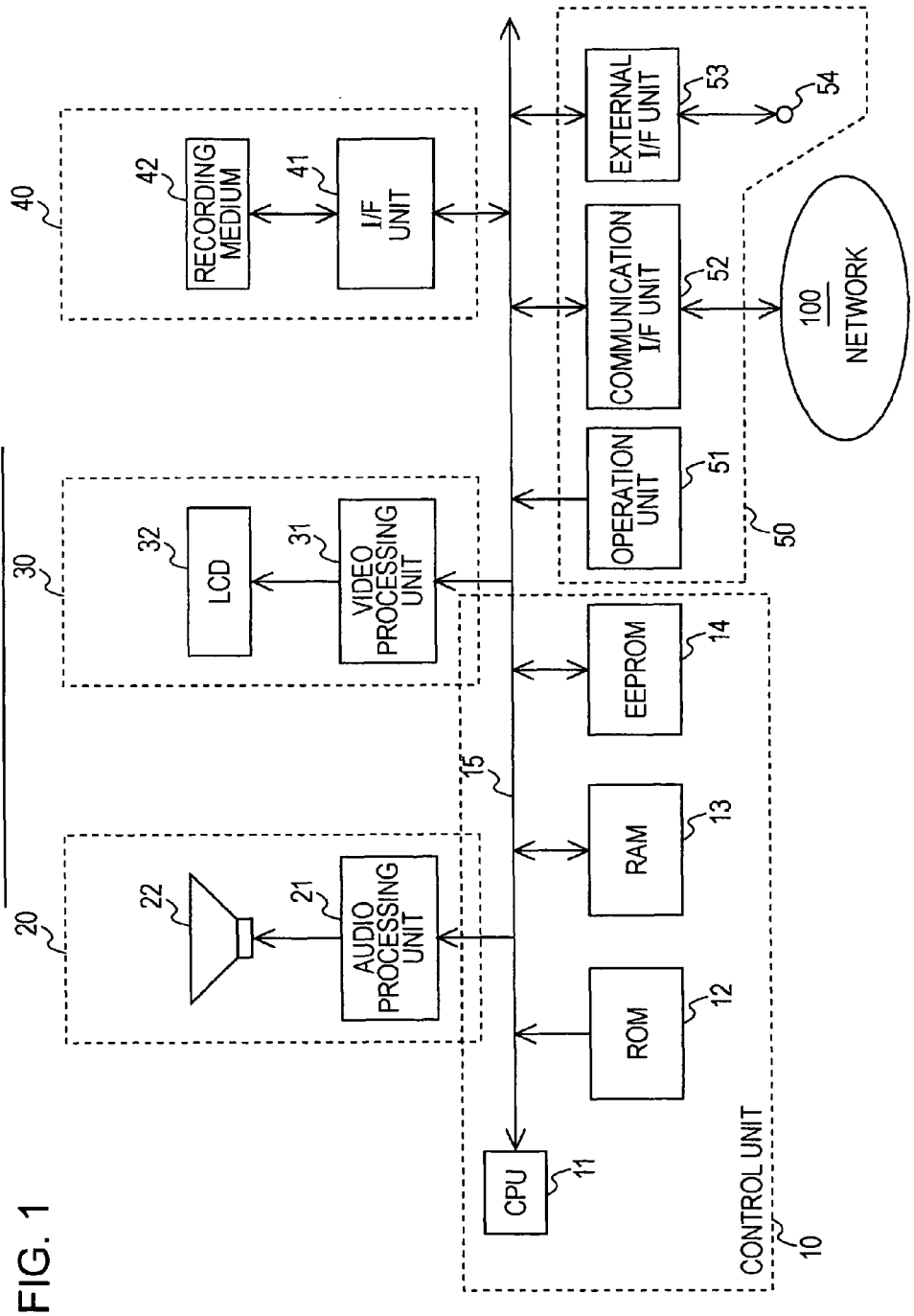
FIG. 1 is a block diagram illustrating an information processing apparatus according to an embodiment of the present invention.

FIG. 1 is a block diagram illustrating a home server to which an apparatus, a method, and a program according to an embodiment of the present invention are applied. According to the present exemplary embodiment, as shown in FIG. 1, an information processing apparatus includes a control unit 10, an audio output unit 20, a video output unit 30, a recording medium drive 40, and an interface unit 50.

The control unit 10 is composed of a microcomputer that controls each of components of the information processing apparatus. The control unit 10 includes a central processing unit (CPU) 11, a read only memory (ROM) 12, a random access memory (RAM) 13, an electronically erasable and programmable ROM (EEPROM) 14, and a CPU bus 15 that connects these components to each other.

The CPU 11 is a main component for controlling the information processing apparatus according to the present exemplary embodiment. The CPU 11 executes a variety of programs so as to carry out a variety of data processing and generate control signals so as to deliver these control signals to each component of the information processing apparatus. The ROM 12 stores the variety of programs executed by the CPU 11 and a variety of data required for the processing.

The RAM 13 temporarily stores intermediate processing results during the variety of processing. The RAM 13 is primarily used as a work area. The EEPROM 14 is a memory known as a nonvolatile memory. The EEPROM 14 stores data to be maintained even when the information processing apparatus is powered off. Examples of the data to be maintained even when the information processing apparatus is powered off include parameters set by a user and a program additionally installed.

The audio output unit 20 includes an audio processing unit 21 and a speaker 22. The control unit 10 controls the information processing apparatus so that audio data is supplied to the audio processing unit 21. The audio processing unit 21 processes the audio data to generate an audio signal supplied to the speaker 22. Additionally, the control unit 10 can control the audio processing unit 21 to carry out adjustment of the volume or the tone of the audio signal. The audio processing unit 21 delivers the audio signal to the speaker 22. The speaker 22 generates sound in response to the audio signal.

The video output unit 30 includes a video processing unit 31 and a liquid crystal display (LCD) 32. The control unit 10 performs control so that video data is delivered to the video processing unit 31. The video processing unit 31 generates a video signal from the video data and supplies the video signal to the LCD 32. Additionally, the control unit 10 can control the video processing unit 31 to carry out adjustment of the image quality. The LCD 32 includes a relatively large display screen. The LCD 32 receives the video signal from the video processing unit 31 and displays a video image in response to the video signal.

For example, the recording medium drive 40 is a hard disk drive. The recording medium drive 40 includes an interface unit (hereinafter simply referred to as an "I/F unit") 41 and a recording medium 42 (such as a hard disk). The recording medium drive 40 writes a variety of data (such as audio data, moving image data, text data, and a game program), operating programs, and data used for the operating programs to the hard disk under the control of the control unit 10. In addition, the recording medium drive 40 can read out the stored data and programs and deliver the data and program to the control unit 10.

In the information processing apparatus according to the present exemplary embodiment, the recording medium drive 40 is assumed to be a hard disk drive. However, the recording medium drive 40 may be, for example, a semiconductor memory drive, an optical disk drive (such as a digital versatile disc (DVD) drive), and a magnetooptical disk drive (such as a mini disc (MD) drive). Additionally, a recording medium may be incorporated in the information processing system or may be removable.

The interface unit 50 includes an operation unit 51 serving as a user interface, a communication interface unit (hereinafter referred to as a "communication I/F unit") 52, an external interface unit (hereinafter referred to as an "external I/F unit") 53, and an input and output terminal 54.

The operation unit 51 includes a variety of operation keys. The operation unit 51 can receive a user operation input, convert the input to an electrical signal, and deliver the electrical signal to the control unit 10. The operation unit 51 further includes a pointing device (such as a mouse or a touch pad) for indicating a point on a display screen to select an information item. Thus, the control unit 10 can control each component in response to the user input.

The communication I/F unit 52 is connected to a network 100 (e.g., the Internet). The communication I/F unit 52 transmits a request and data to a desired server or a terminal station via the network 100. In addition, the communication I/F unit 52 receives a variety of data from a desired server or a terminal station via the network 100.

A variety of data including audio data and video data received by the communication I/F unit 52 are recorded in the recording medium 42 via the control unit 10 and the I/F unit 41. Additionally, the data received by the communication I/F unit 52 are delivered to the audio output unit 20 or the video output unit 30 via the control unit 10 to be output.

The external I/F unit 53 allows the information processing apparatus to communicate with different external apparatuses. The external I/F unit 53 exchanges a variety of data with external apparatuses (such as audio visual (AV) equipment and personal computers) connected to the input and output terminal 54. The data including audio data and video data received via the external I/F unit 53 and the input and output terminal 54 are recorded in the recording medium 42 via the control unit 10 and the I/F unit 41. Additionally, the data received by the external I/F unit 53 and the input and output terminal 54 are delivered to the audio output unit 20 or the video output unit 30 via the control unit 10 to be output.

The information processing apparatus according to the present exemplary embodiment stores a variety of content items in the recording medium 42. Thus, the information processing apparatus can use the variety of content items in the recording medium 42. However, if a user needs to perform various operations and if the time required to find a desired content item among many content items is long, the operation of the apparatus becomes troublesome.

Accordingly, the information processing apparatus according to the present exemplary embodiment displays an information item appropriate for each of a plurality of content items stored in the recording medium 42 on the LCD 32. The user searches for the desired content item using this displayed information item. Thus, the user can use the content item (e.g., playing back the content item).

In particular, according to the present exemplary embodiment, when displaying a plurality of display information items, each corresponding to one of the plurality of content items, the information processing apparatus can display these display information items after grouping the display information items corresponding to the same content item or grouping the display information items corresponding to content items having some information that is common to the content items. Accordingly, the user can clearly recognize a relationship among the display information items, and therefore, the user can simply and rapidly search for or select a desired content item.

Content Item and Display Information

Figure 2:
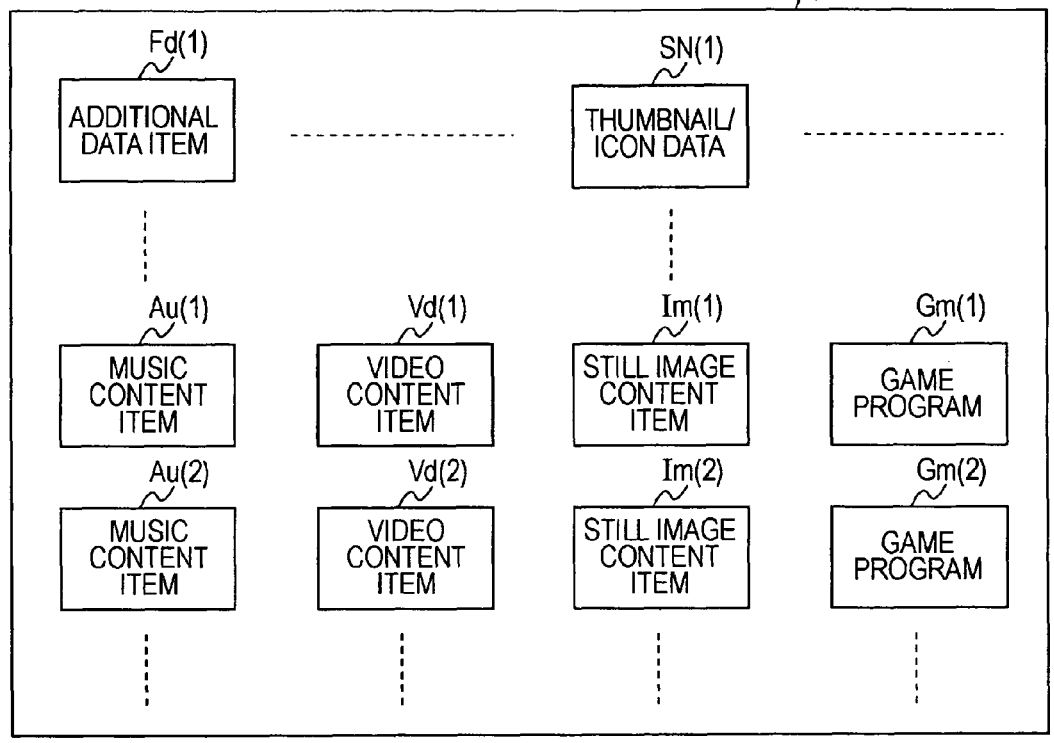
FIG. 2 illustrates data stored in a recording medium 42 of the information processing apparatus shown in FIG. 1.

FIG. 2 illustrates data stored in the recording medium 42 of the information processing apparatus according to the present exemplary embodiment. As shown in FIG. 2, the recording medium 42 of the information processing apparatus according to the present exemplary embodiment stores music content items Au(1), Au(2), . . . , video content items Vd(1), Vd(2), . . . , still image content items Im(1), Im(2), . . . , and game programs Gm(1), Gm(2), . . .

Here, each of the music content items Au(1), Au(2), . . . is audio data or song data performed by a variety of artists. The audio data is in the form of a file storing one song or in the form of a so-called folder that stores a plurality of files, each including one song. Also, each of the music content items Au(1), Au(2), . . . is, for example, data known as MP3 data obtained by encoding data (music) according to the Moving Picture Experts Croup 1 Audio Layer 3 (MP3) standard.

Each of the video content items Vd(1), Vd(2), . . . is, for example, a movie or a recorded TV broadcast program. The video content is a so-called AV data including moving image data and audio data to be synchronously played back. Each of the video content items Vd(1), Vd(2), . . . is, for example, data known as MPEG data obtained by encoding data (video) according to the Moving Picture Experts Croup (MPEG) standard.

Each of the still image content items Im(1), Im(2), . . . is, for example, still image data captured by a digital camera. The still image content may be in the form of a file storing one image or may be in the form of a folder that stores a plurality of files, each including one image. Also, each of still image content items Im(1), Im(2), . . . is, for example, data known as JPEG data obtained by encoding data (an image) according to the Joint Photographic Experts Croup (JPEG) standard. In addition, each of still image content items Im(1), Im(2), . . . may be a file in an Exchangeable Image File (Exif) format, which is widely used for digital cameras.

Each of game programs Gm(1), Gm(2), . . . is a program for providing a variety of games. In the present exemplary embodiment, the game program includes a variety of data needed when the game program is executed.

Additionally, as used herein, for convenience, a collection that includes one or more content items is referred to as a "folder". The above-described data are provided from a server in the network 100 via the communication I/F unit 52. Alternatively, the above-described data are provided from an external apparatus via the external I/F unit 53.

The content items stored in the recording medium 42 include additional data items Fd(1), Fd(2), . . . The additional data Fd includes information for identifying the corresponding content item and text data related to the corresponding content item. This text data included in the additional data Fd is used as a display information item corresponding to the content item.

Note that the additional data items Fd(1), Fd(2), . . . are collectively referred to as "additional data Fd". Similarly, the music content items Au(1), Au(2), . . . are collectively referred to as "music content Au". The video content items Vd(1), Vd(2), . . . are collectively referred to as "video content Vd". The still image content items Im(1), Im(2), . . . are collectively referred to as "still image content Im". The game programs Gm(1), Gm(2), . . . are collectively referred to as "game programs Gm".

In addition, the music content items Au(1), Au(2), . . . the video content items Vd(1), Vd(2), . . . , the still image content items Im(1), Im(2), . . . , and the game programs Gm(1), Gm(2), . . . are collectively and simply referred to as "content items".

Furthermore, thumbnail/icon data SN(1), SN(2), . . . are provided for the content items stored in the recording medium 42. Each of the thumbnail/icon data SN(1), SN(2), . . . is data used for generating a thumbnail image corresponding to the content item (i.e., thumbnail data). Alternatively, each of the thumbnail/icon data SN(1), SN(2), . . . may be data used for generating an icon image corresponding to the content item (i.e., icon data). This thumbnail image generated from thumbnail data or icon image generated from icon data is one of the display information items corresponding to each content item.

Hereinafter, the thumbnail icon data SN(1), SN(2), . . . are collectively referred to as "thumbnail/icon data SN". For example, for music content Au, thumbnail data formed by reducing the picture of the album jacket or the artist of the music content Au is provided as thumbnail/icon data SN. Additionally, for example, for video content Vd or still image content Im, thumbnail data formed by reducing part of the image or the title image of the content is provided as thumbnail/icon data SN.

Additionally, for the game program Gm, icon data for an icon image composed of a picture, text, or a symbol representing the game program is provided as thumbnail/icon data SN. In addition, thumbnail data may be associated with the game program Gm. Also, icon data may be associated with each of the music content items Au, the video content items Vd, and the still image content items Im.

According to the present exemplary embodiment, if additional data item Fd is selected, the image processing apparatus can determine the content item corresponding to the additional data item Fd. Conversely, if content item is selected, the image processing apparatus can determine the additional data item Fd corresponding to the content item. Thus, the additional data item Fd and the content item have a one-to-one correspondence.

Furthermore, according to the present exemplary embodiment, if a content item is selected, the image processing apparatus can determine the thumbnail/icon data SN corresponding to the content item. Conversely, if thumbnail/icon data SN is selected, the image processing apparatus can determine the content item corresponding to the thumbnail/icon data SN. Thus, the thumbnail/icon data SN and the content item have a one-to-one correspondence.

In such a case, the content item and the thumbnail/icon data SN have a one-to-one correspondence through, for example, the additional data Fd. That is, if the thumbnail/icon data SN is selected, the additional data Fd corresponding to the thumbnail/icon data SN is determined. Conversely, if the additional data Fd is selected, the thumbnail/icon data SN corresponding to the additional data Fd is determined. Thus, the content item and the thumbnail/icon data SN have a one-to-one correspondence through the additional data Fd.

As will be described below, as in the case where the content item has a direct correspondence to the additional data item Fd, the content item can have a direct correspondence to the thumbnail/icon data SN.

Exemplary Structure of Additional Data

Figure 3:
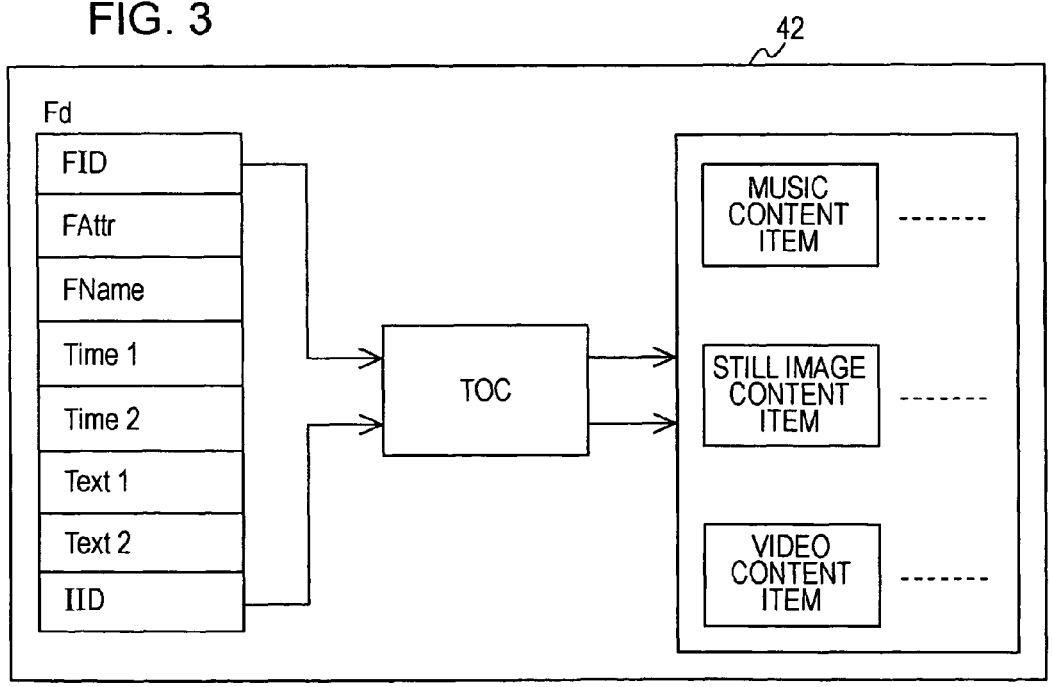
FIG. 3 illustrates an exemplary structure of additional data Fd and an exemplary method for referencing the content item corresponding to the additional data item Fd.

An exemplary structure of the additional data is described next. The additional data item Fd includes text information, which is one of display information items corresponding to the content item. Additionally, the additional data item Fd can link the content item to the corresponding the thumbnail/icon data SN. FIG. 3 illustrates an exemplary structure of the additional data item Fd. FIG. 3 also illustrates a method for referencing the content item corresponding to the additional data item Fd.

As shown in the left section of FIG. 3, the additional data item Fd is a list including entries for a file/folder identifier (FID), a file/folder attribute (FAttr), a file/folder name (FName), date and time information (Time), text information (Text), and an image/icon identifier (IID).

When the additional data item Fd is associated with a content item having a file format, the FID is an identifier that uniquely indicates the file. When the additional data item Fd is associated with a content item having a folder format, the FID is an identifier that uniquely indicates the folder. The FID may include an absolute path from the root folder. The information processing apparatus references a table of contents (TOC) shown in the middle section of FIG. 3 on the basis of the FID so as to identify the recorded position of the content item in the form of a file or a folder stored in the recording medium 42 shown in the right section of FIG. 3. In this way, the additional data item Fd is associated with the content item and is stored.

The TOC is provided in the recording medium 42 at a predetermined location, such as the outermost periphery or the innermost periphery of the recording medium 42 (hard disk). The TOC stores information about a recording location of a file or a folder recorded on the hard disk. That is, the TOC stores the list of content of data recorded on the recording medium 42.

The FAttr represents the attribute of the content item (a file or a folder). That is, the FAttr can store the information on whether the file (folder) is read-only or not, the file (folder) is a hidden file (folder) or not, and the file (folder) is encrypted or not. In addition, the FAttr may include the creation date and time, the update date and time, and the last access date and time of the file (folder).

The FName represents the name of the content item (the file or the folder). The FName may include a file extension used in MS-DOS (trade name). The name is a combination of any alphanumeric characters and some of symbol characters. Also, multibyte characters, such as kanji characters, can be used for the FName. By adding a file extension to the name of the content item (the file or the folder), the information processing apparatus can identify the type of the content item. For example, the extension ".mp3" indicates that the content item is a music content item having an MP3 format. The extension ".jpg" indicates that the content item is still image data having a JPEG format.

The extension is associated with an application program used for playing back the content item. By referencing the extension, the information processing apparatus can easily start the application program. In general, the extension is not appended to a folder. However, the extension may be appended to a folder. When the extension is appended to a folder, the information processing apparatus processes only content items having the same extension in that folder.

The Time is data and time information. The additional data item Fd can contain a plurality of date and time information items. In FIG. 3, the additional data item Fd contains two date and time information items: Time 1 and Time 2. The information processing apparatus can set the desired number of Times, add a new Time, and delete the Time by using data structures such as a uni-directional list and a bi-directional list. This date and time information item includes time information (such as year, month, day, day of the week, hour, minute, and second) and event information related to the time information. For example, the date and time information item is represented as "2004.02.18@release", "2005.01.25@purchase", or "2005.04.18@photographing". Thus, the event related to the date and time information item is described.

The Text contains a text information item, such as a memorandum, a comment, or a description. As noted above, this text information item is one of the display information items associated with the content item. The additional data item Fd can include a plurality of text information fields. In FIG. 3, the additional data item Fd contains two text information items: Text1 and Text2. Like the Time, the information processing apparatus can set a desired number of Texts, add a new Text, and delete the Text by using data structures such as a unidirectional list and a bi-directional list. In general, the length of the text information item (i.e., the number of characters) can be freely determined. However, for ease of processing in display application programs (e.g., a browser), the length of the text information item may be limited to, for example, 256 characters at maximum.

The IID is an identifier that uniquely identifies the thumbnail/icon data SN associated with the content item (the file or the folder). The thumbnail/icon data SN is thumbnail data or icon data. The IID uniquely identifies the thumbnail data or icon data associated with the additional data item Fd, in particular, with the above-described text information item.

The information processing apparatus identifies the recording location of the thumbnail/icon data SN on the recording medium 42 on the basis of the IID by referencing the TOC shown in the middle section of FIG. 3. In this way, the text information item is associated with the thumbnail data and, then, the both are stored. It is noted that an original image may be reduced to generate a thumbnail image and the thumbnail image may be stored in the recording medium 42. Alternatively, only the original image may be stored in the recording medium 42. If only the original image is stored in the recording medium 42, the information processing apparatus accesses the original image and generates a reduced image by reducing the original image. Subsequently, the information processing apparatus uses the reduced image.

While the present exemplary embodiment has been described with reference to the additional data item Fd as shown in the left section of FIG. 3, it should be apparent to those skilled in the art that it is not limited thereto, but the additional data item Fd can include data other than the above-described data depending on an intended application. For example, when the content item is a music content item, the additional data item Fd can have a file format including the album name, the artist name, the genre of a song, the title of the song, the playing time, the encoding format, the sampling frequency, the amplitude resolution, and the channel configuration. In addition, when the content item is a still image content item, such as a picture, the additional data item Fd can have a file format including the name of a photographer, the encoding format, the number of pixels, and the number of colors. Furthermore, the additional data item Fd can include a default program for playing back the content item.

Correspondence Between Content Item and Display Information

Figure 4:
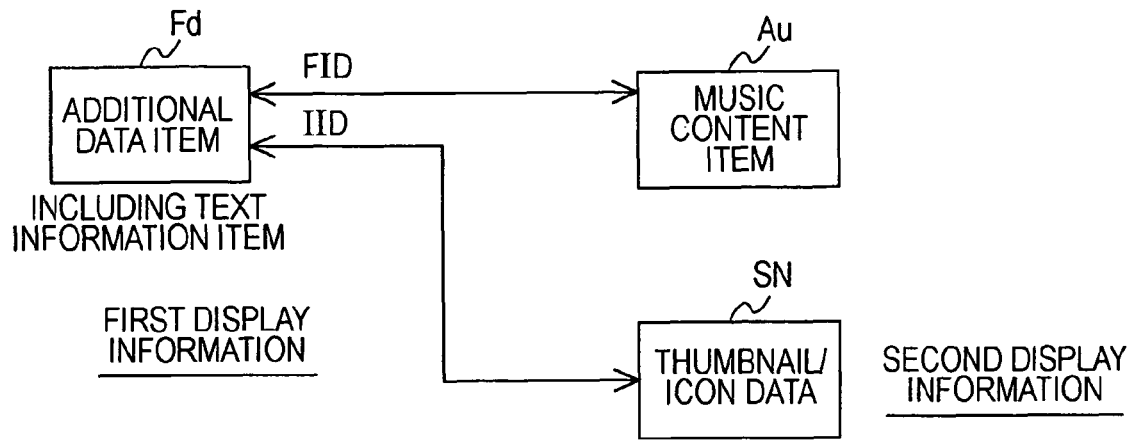
FIG. 4 is a diagram illustrating an example of the correspondence between a content item and a display information item.

The correspondence between the content item and the display information is described below. FIG. 4 is a diagram illustrating the correspondence between the content item and the display information in the information processing apparatus according to the present exemplary embodiment. For simplicity, in FIG. 4, the relationship between the music content Au, which is one type of content, and the corresponding display information is described.

As described in FIG. 3, the additional data item Fd provided for the corresponding music content item Au includes a text information item corresponding to the music content item Au as a display information item. The additional data item Fd is associated with the music content item Au by means of the FID.

Furthermore, as described with reference to FIG. 3, the additional data item Fd is associated with the thumbnail/icon data SN by means of the IID. Here, the thumbnail/icon data SN is the display information item corresponding to the music content item Au. Also, the thumbnail/icon data SN is thumbnail data forming a thumbnail image or icon data forming an icon image.

As noted above, in the information processing apparatus according to the present exemplary embodiment, two display information items are associated with the music content item Au. One is a text information item contained in the additional data item Fd and the other is the thumbnail image or the icon image formed from the thumbnail/icon data SN. In the present exemplary embodiment, the text information item is a first display information item and the thumbnail image or the icon image is a second display information item.

On the basis of the additional data item Fd associated with the content item, the information processing apparatus can display the text information item contained in the additional data item Fd on the LCD 32. Furthermore, the information processing apparatus can display the thumbnail image or the icon image corresponding to the thumbnail data or the icon data identified by the IID contained in the additional data item Fd on the LCD 32. In such a case, both a text information item contained in the additional data item Fd and thumbnail image (or icon image) corresponding to the thumbnail data (or the icon data) identified by the IID contained in the additional data item Fd are display information items corresponding to the same music content item Au.

When the text information item displayed on the LCD 32 is selected, the information processing apparatus can perform control so as to identify the music content item Au on the basis of the FID of the additional data item Fd containing that text information item and play back the music content item Au. In contrast, when the thumbnail image or the icon image is selected, the information processing apparatus can identify the corresponding music content Au item via the corresponding additional data item Fd and play back that music content item Au.

The additional data item Fd is directly associated with the music content Au by means of the FID. Additionally, the additional data item Fd is directly associated with the thumbnail/icon data SN by means of the FID. Furthermore, the thumbnail/icon data SN is associated with the music content item Au through the additional data item Fd.

When the information processing apparatus according to the present exemplary embodiment receives an operation input to instruct the display of a list of music content items, the control unit 10 can read out the additional data items Fd corresponding to the music content items stored in the recording medium 42 and display a text information item stored in the Text1 or Text2 of the additional data item Fd for each of the music content items. At the same time, the control unit 10 can display the thumbnail image or the icon image based on the thumbnail/icon data SN identified by the IID of the additional data item Fd for each of the music content items.

Figure 5:
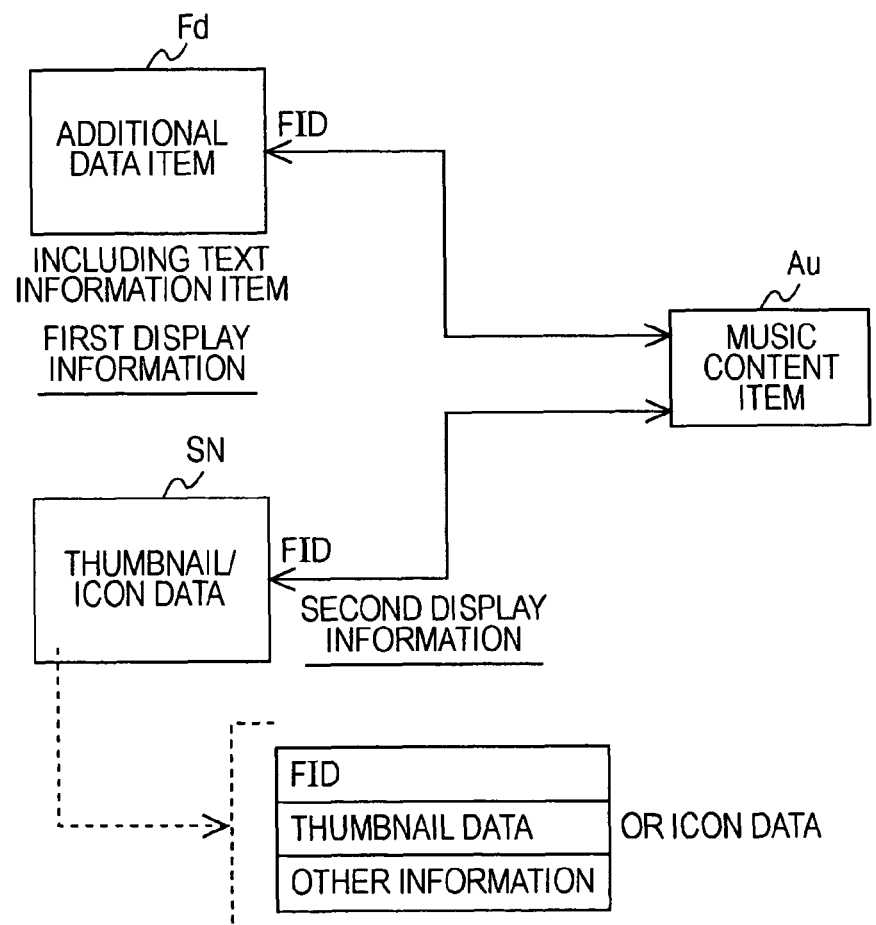
FIG. 5 is a diagram illustrating another example of the correspondence between a content item and a display information item.

In the example shown in FIG. 4, the music content item Au is associated with the thumbnail/icon data SN through the additional data item Fd. However, the music content item Au can be directly associated with the thumbnail/icon data SN. FIG. 5 is a diagram illustrating an example in which the music content item Au is directly associated with the thumbnail/icon data SN.

The relationship between the additional data item Fd and the music content item Au is the same as that shown in FIG. 4. However, the data structure of the thumbnail/icon data SN includes an FID used for associating itself with the music content item Au and also includes thumbnail data or icon data. Thus, the music content item Au can be directly associated with the thumbnail/icon data SN.

In the example shown in FIG. 4, if the music content item Au is selected, the additional data item Fd corresponding to the music content item Au is determined. Subsequently, the thumbnail/icon data SN corresponding to the music content item Au is determined using the information in the additional data item Fd. In contrast, in the example shown in FIG. 5, if the music content item Au is selected, the additional data item Fd and the thumbnail/icon data SN corresponding to the music content item Au are determined at the same time.

Operation of Information Processing Apparatus and Example of Display Information The operation of the information processing apparatus and an example of display information according to the present exemplary embodiment are described next on the basis of the above-described configuration of the information processing apparatus and the above-described relationship between the data. The information processing apparatus according to the present exemplary embodiment displays text information items, which are the first display information items corresponding to a plurality of the music content items Au stored in the recording medium 42, and thumbnail images, which are the second display information items corresponding to a plurality of the music content items Au stored in the recording medium 42, on a display screen of the LCD 32. The user can search for and select a desired music content item on the basis of the display information items on the display screen.

Example 1 (Entire Display Screen is Used as One Display Region)

Figure 6:
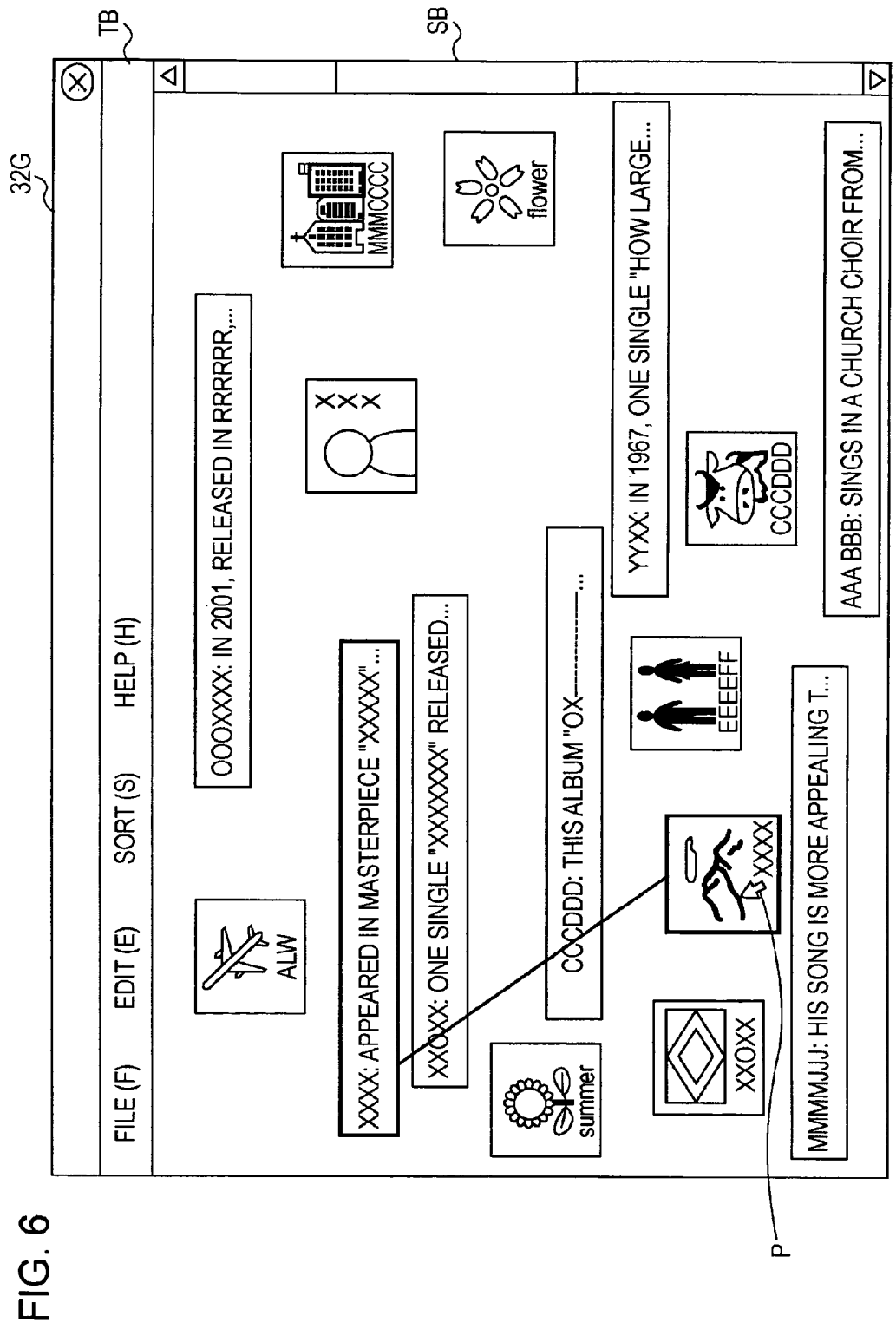
FIG. 6 illustrates an example of a list of music content items displayed on the entire display screen serving as a single display region.

FIG. 6 illustrates an example in which the information processing apparatus according to the present exemplary embodiment displays a list of music content items Au. The user performs an operation via the operation unit 51 to display a list of music content items Au stored in the recording medium 42. The control unit 10 references the additional data items Fd of music content items stored in the recording medium 42 via the I/F unit 41 on the basis of the operation input from the operation unit 51. The control unit 10 loads information necessary for the display operation into the RAM 13 on the basis of the additional data items Fd. The control unit 10 then displays a list of music content items shown in FIG. 6 on a display screen 32G of the LCD 32 using the information loaded to the RAM 13. The control unit 10 identifies the display positions of display information items on the LCD 32 by using coordinates of the display positions on the LCD 32.

In the example shown in FIG. 6, text information items contained in the additional data items Fd and thumbnail images are randomly displayed. The thumbnail image is generated from the thumbnail/icon data SN. This thumbnail/icon data SN is identified by means of an identifier (hereinafter referred to as a "thumbnail identifier") IID of the thumbnail/icon data SN provided for the additional data Fd. The reason the text information items and the thumbnail images corresponding to the music content items Au are randomly displayed is that the user can search for a music content item Au in the same manner as if the user were playing a game, for example. As used herein, the term "random display" is referred to as a display method in which the display information is displayed without any regularity.

FIG. 6 illustrates an example of the list of music content items displayed on the display screen 32G of the LCD 32 of the information processing apparatus according to the present exemplary embodiment. To display the list of music content items, the entire display screen 32G is used as one display region. A tool bar TB and a scroll bar SB are also displayed in the display region in addition to the list of music content items.

In FIG. 6, a plurality of horizontally long rectangular sections in the display region are used for displaying text information items (such as liner notes or comments), which are the first display information items corresponding to the music content items Au. The information processing apparatus displays only part of the text information item due to the limitation of the size of the display region. Additionally, in FIG. 6, a plurality of square sections in the display region are used for displaying the thumbnail images, which are the second information items corresponding to the music content items Au.

The thumbnail images may be replaced by the icon images corresponding to the music content items Au. In addition, as described below, in the case of a music content item, a thumbnail image may be provided for one song or may be provided for a set of a plurality of songs (e.g., an album).

Since, as described above, the text information item is displayed in the horizontally long rectangular section having a predetermined size due to the size of the display region, the full text could not be displayed. If the full text cannot be displayed in the rectangular section, the information processing apparatus displays a symbol ". . . " appended to the displayed text in place of the remaining text information that is not displayed. If the symbol ". . . " is displayed, the user recognizes that remaining text exists. If the symbol ". . . " has the width of one character, the number of characters of the displayed text information is the maximum number of characters that can be displayed in the horizontally long rectangular section minus one.

The control unit 10 of the information processing apparatus according to the present exemplary embodiment includes a variety of fonts in the ROM 12, and therefore, the information processing apparatus can display the text information in a variety of ways. However, since the type of font and the size of the font are not essential factors of the present invention, the detailed descriptions are not provided herein.

As described in FIG. 4, for each music content item Au, the text information item is associated with the thumbnail/icon data SN forming a thumbnail image. In general, the text information item has a one-to-one correspondence to the thumbnail/icon data SN.

Additionally, as shown in FIG. 6, a mouse pointer (hereinafter simply referred to as a "pointer") P is displayed on the display screen 32G of the LCD 32. By operating the operation unit 51, the user can move the display position of the pointer P. For example, the operation unit 51 is a pointing device, such as a mouse. The control unit 10 controls the video output unit 30 to move the display position of the pointer P in response to the operation input from the user. That is, the control unit 10 precisely detects not only the positions of the text information items and the thumbnail images but also the position of the pointer P. The control unit 10 can change the position of the pointer P any time in response to the instruction from the user.

Subsequently, as shown in FIG. 6, the user moves the pointer P using the operation unit 51 while the list of music content items is randomly displayed. When the user locates the pointer P in the display area of the desired text information item or in the display area of the desired thumbnail image, the control unit 10 detects that the pointer P is located on the display information item. The control unit 10 identifies the display information item indicated by the pointer P and other display information items related to that display information item on the basis of the detection result so as to clearly display that the display information item and the other display information items have a correspondence with each other. In the present exemplary embodiment, the display information item indicated by the tip of the arrow-type pointer P is the above-mentioned display information item.

As shown in FIG. 6, the text information item corresponding to the thumbnail image indicated by the pointer P is the second text information item from the top of the LCD 32. In the present exemplary embodiment, the text information item is linked to the thumbnail image by using a line, that is, a line object. Additionally, the display areas of the text information item and the thumbnail image are outlined with bold lines or colored lines. In this way, the information processing apparatus clearly shows the correspondence between the display information item indicated by the pointer P and the different display information items related to that display information item.

If a thumbnail image and the text information item corresponding to the thumbnail image have a relationship described in FIG. 4, the control unit 10 identifies the different display information items related to the display information item indicated by the pointer P through the additional data Fd. Thereafter, the control unit 10 identifies the display position of the identified different display information items on the basis of the position information of the display information items managed by the control unit 10. The control unit 10 then displays the correspondence using a line object and changes the outlines for the thumbnail image and the text information item corresponding to the thumbnail image.

That is, the text information item contained in the additional data item Fd can be associated with the thumbnail image or the icon image formed from the thumbnail/icon data SN by using the thumbnail identifier IID contained in the additional data item Fd as relational information.

In addition, when the thumbnail image and the text information item corresponding to the thumbnail image have the data relationship described in FIG. 5, the control unit 10 identifies different display information items having the same FID as that of the display information item indicated by the pointer P. Thereafter, the control unit 10 identifies the position information about the identified different display information items on the basis of the position information on the display information items managed by the control unit 10. The control unit 10 then displays the correspondence using a line object and changes the outlines for the thumbnail image and the text information item corresponding to the thumbnail image. That is, the control unit 10 detects display information items corresponding to the same music content item Au and, subsequently, displays links that associate the display information items with each other.

Note that a thumbnail image and the text information item corresponding to the thumbnail image are not always displayed in one screen. In such a case, according to the present exemplary embodiment, when the user moves the scroll bar SB displayed at the rightmost section of the screen in the vertical direction, the information processing apparatus can display different text information items or a different thumbnail image with the thumbnail image indicated by the pointer P being displayed on the screen. This design allows the information processing apparatus to display the thumbnail image, the text information item corresponding to the thumbnail image, and the links that associate these display information items with each other in one screen.

Alternatively, when the text information item corresponding to the thumbnail image indicated by the pointer P is not displayed in one screen, the control unit 10 may control the video output unit 30 so that the information processing apparatus automatically displays the text information item and the thumbnail image in one screen.

In FIG. 6, the pointer P is located on the thumbnail image. However, even when the pointer P is located on the text information item, a control similar to the above-described control can be performed. Thus, a link between the text information item indicated by the pointer P and the thumbnail image related to the text information item can be displayed.

Additionally, according to the present exemplary embodiment, the display area of the text information item related to the thumbnail image indicated by the pointer P can be expanded so that the full text of the text information item is displayed. The information processing apparatus can also expand the display area of the text information item indicated by the pointer P so that the full text of the text information item is displayed.

The information processing apparatus can rapidly identify the related display information by referencing management information loaded and maintained in the RAM 13. In addition, the information processing apparatus can rapidly and accurately identify the corresponding music content item. The management information includes the following four items: 1) an FID for identifying the music content item Au associated with the additional data Fd to which the displayed text information item belongs; 2) the display position of the text information item; 3) a thumbnail identifier IID for identifying thumbnail data corresponding to the text information item; and 4) the display position of a thumbnail image of the thumbnail data corresponding to the text information item.

When a predetermined confirmation operation is carried out on the operation unit 51 with the pointer P indicating the display area of the text information item or the display area of the thumbnail image, the information processing apparatus identifies the music content item Au corresponding to the text information item or the thumbnail image. Thereafter, the information processing apparatus supplies the corresponding music content item Au to the video output unit 30 to play back the music content item Au. Examples of the predetermined confirmation operation include depressing a click button when the operation unit 51 is a mouse.

Example 2 (Entire Display Screen is Used as One Display Region)

Figure 7:
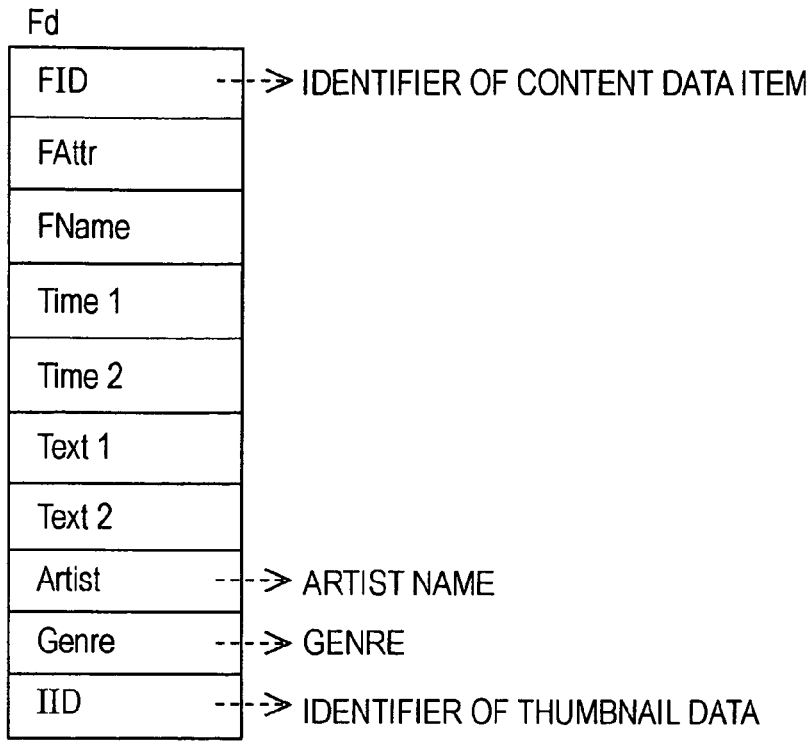
FIG. 7 illustrates another example of the structure of the additional data item Fd.

As noted above, the additional data item Fd can contain a variety of information items in addition to the information items shown in FIG. 3. For example, FIG. 7 illustrates the additional data item Fd further including an artist name "Artist" and a genre "Genre" in addition to the items in the additional data item Fd shown in FIG. 3. The fields other than the artist name "Artist" and the genre "Genre" are idehose shown in FIG. 3.

Here, the artist name "Artistntical to t" indicates the name of the artist of the corresponding music content item Au. The name of the artist may be the name of a group. Also, the name of the artist may be a corporate name, such as "AA Symphony Orchestra". The genre "Genre" indicates the type of music content item, such as Japanese song, pop, jazz, classical, or hiphop.

Figure 8:
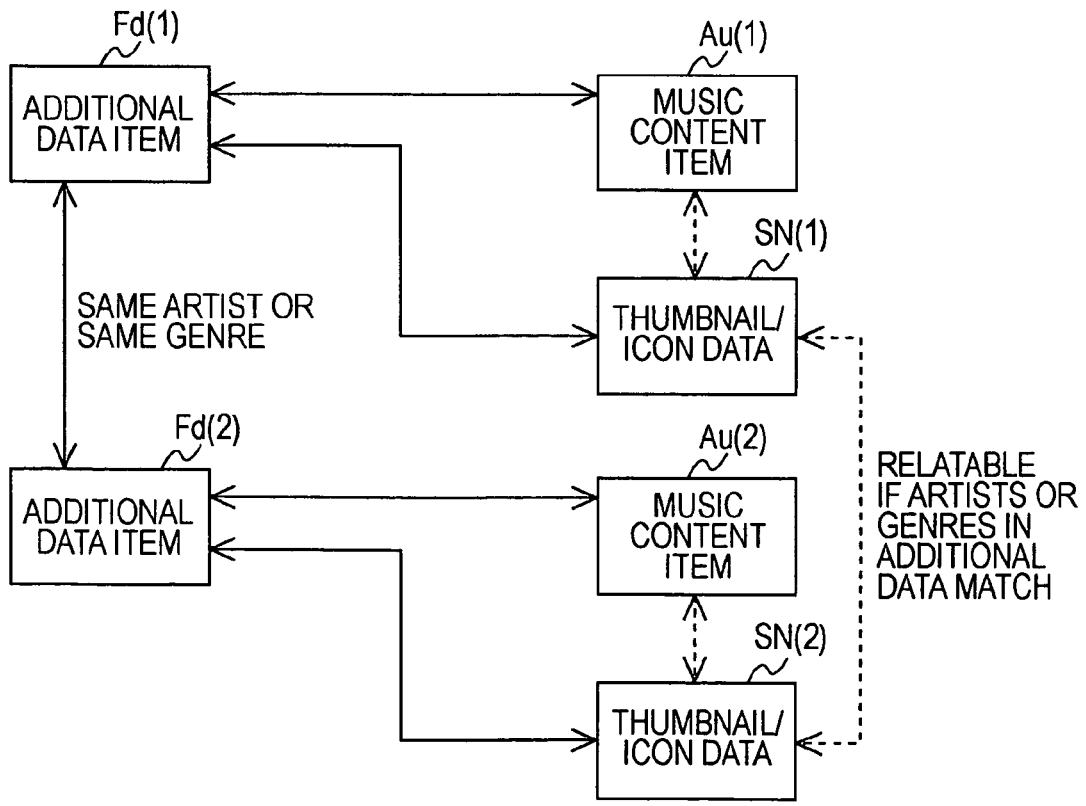
FIG. 8 is a diagram illustrating another example of the correspondence between a content item and a display information item.

By adding the information artist name "Artist" and genre "Genre" to the additional data Fd, the information processing apparatus can associate one additional data item Fd with another additional data item Fd. FIG. 8 illustrates the correspondence between additional data items Fd. In FIG. 8, an additional data item Fd (1) and thumbnail/icon data SN (1) correspond to the music content item Au (1). Additionally, an additional data item Fd (2) and thumbnail/icon data SN (2) correspond to the music content item Au (2).

The information processing apparatus can identify the music content item Au (1) using the FID contained in the additional data item Fd (1). In addition, the information processing apparatus can identify the thumbnail/icon data SN (1) using the thumbnail identifier IID contained in the additional data item Fd (1). Similarly, the information processing apparatus can identify the music content item Au (2) using the FID contained in the additional data item Fd (2). In addition, the information processing apparatus can identify the thumbnail/icon data SN (2) using the thumbnail identifier IID contained in the additional data item Fd (2).

This relationship is similar to that described in FIG. 4. The information processing apparatus can identify the music content item Au (1) and the thumbnail/icon data SN (1) through the additional data item Fd (1). Also, the information processing apparatus can identify the music content item Au (2) and the thumbnail/icon data SN (2) through the additional data item Fd (2).

Furthermore, as shown in FIG. 7, by adding the information artist name "Artist" and genre "Genre" to the additional data item Fd, the information processing apparatus can associate one additional data item Fd with another additional data item Fd. That is, as shown in FIG. 8, the information processing apparatus determines whether the artist name in the additional data item Fd (1) is the same as the artist name in the additional data item Fd (2) or whether the genre in the additional data item Fd (1) is the same as the genre in the additional data item Fd (2). If at least one of the artist name and the genre is the same between the additional data item Fd (1) and the additional data item Fd (2), the information processing apparatus associates the additional data item Fd (1) with the additional data item Fd (2).

In this way, for example, if the additional data item Fd (1) is associated with the additional data item Fd (2), the information processing apparatus can associate the thumbnail/icon data SN (1) with the thumbnail/icon data SN (2) through the thumbnail identifiers IID contained in the additional data item Fd (1) and the additional data item Fd (2).

The thumbnail identifier IID, which is a first association information item, associates the text information contained in the additional data item Fd with the thumbnail image. In contrast, the artist name "Artist" or genre "Genre", which is a second association information item, contained in the additional data item Fd corresponding to a different music content item Au associates the thumbnail image of one music content item Au with the thumbnail image of the different music content item Au.

By using this relationship, among displayed thumbnail images of a plurality of music content items Au, the information processing apparatus can display the thumbnail images having the same second association information item while associating the thumbnail images with each other. For example, the information processing apparatus can display thumbnail images having the same artist name "Artist" while associating with each other. Furthermore, the information processing apparatus can display thumbnail images having the same genre "Genre" while associating with each other. Alternatively, the information processing apparatus can display thumbnail images having the same artist name "Artist" and the same genre "Genre" while associating with each other.

Similarly, the information processing apparatus can display the text information items of a plurality of the music content items Au while associating the text information items having the same second association information item with each other. For example, the information processing apparatus can display the text information items while associating the text information items having the same artist name "Artist" with each other. Furthermore, the information processing apparatus can display the text information items while associating the text information items having the same genre "Genre" with each other. Alternatively, the information processing apparatus can display text information items having the same artist name "Artist" and the same genre "Genre" while associating with each other.

Still furthermore, the information processing apparatus can display the thumbnail images and the text information items related to a plurality of the music content items Au while associating the thumbnail image with the text information item having the same second association information. For example, the information processing apparatus can display the thumbnail image and the text information item while associating the thumbnail image with the text information item having the same artist name "Artist". Furthermore, the information processing apparatus can display the thumbnail image and the text information item while associating the thumbnail image with the text information having the same genre "Genre". Alternatively, the information processing apparatus can display the thumbnail image and the text information item while associating the thumbnail image with the text information having the same artist name "Artist" and the same genre "Genre".

For example, the information processing apparatus can change the way of displaying the association link between the thumbnail image and the text information item for the same music content item Au from the way of displaying the association link between thumbnail images, between text information items, or between a thumbnail image and a text information item having at least one of the same artist name "Artist" and the genre "Genre". This design allows the information processing apparatus to clearly indicate to the user whether the display information item is for the same music content item Au or for different music content items Au having the same artist name "Artist" and/or the same genre "Genre".

Figure 9:
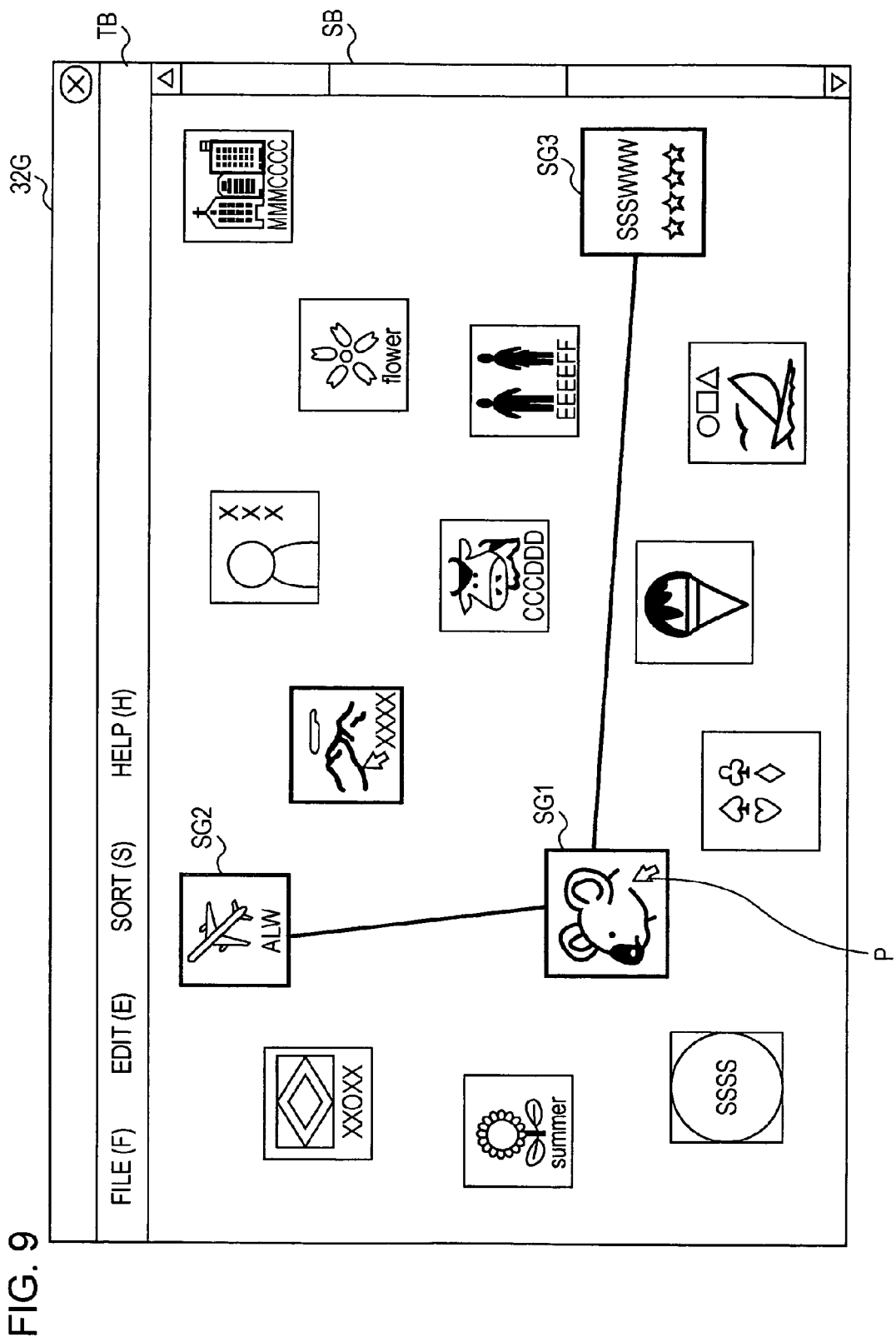
FIG. 9 illustrates an example of a list of music content items displayed on the entire display screen serving as a single display area.

FIG. 9 illustrates an example in which the information processing apparatus displays thumbnail images corresponding to different music content items Au having the same second association information item and displays the association link between the thumbnail images. By using the design in which the additional data items Fd of different music content items Au can be associated with each other, the information processing apparatus can associate the thumbnail images with each other. Here, when a plurality of music content items Au having the same artist name "Artist" are present, the thumbnail images corresponding to the music content items Au and the association link between the thumbnail images are displayed.

FIG. 9 also illustrates the display screen 32G of the LCD 32 in which the thumbnail images corresponding to a plurality of music content items Au are displayed. The information processing apparatus generates the thumbnail images on the basis of the thumbnail/icon data SN. In order to display a plurality of different thumbnail images, the information processing apparatus loads and holds a table that associates a thumbnail identifier IID with the display position of a thumbnail image on the display screen 32G in the RAM 13. The thumbnail identifier IID is used for identifying the thumbnail/icon data SN forming a thumbnail image to be displayed.

In FIG. 9, the position of the pointer P is moved using the operation unit 51 of the information processing apparatus and the display position of the pointer P is located in a thumbnail image SG1. When the pointer P is moved onto the thumbnail image SG1, the control unit 10 identifies the thumbnail image SG1 indicated by the pointer P on the basis of the information about the display position of the pointer P and the table information loaded in the RAM 13.

Subsequently, the control unit 10 identifies the thumbnail identifier IID corresponding to the identified thumbnail image on the basis of the table information loaded in the RAM 13. The control unit 10 then identifies the additional data item Fd having this thumbnail identifier IID. The control unit 10 references the artist name "Artist" of the identified additional data item Fd and finds other additional data items Fd having the same artist name "Artist".

Thereafter, the control unit 10 identifies a thumbnail image using the thumbnail identifier IID of the found additional data item Fd and identifies the display position of the thumbnail image. The control unit 10 then displays the thumbnail images having the same artist name "Artist" and the association link between the thumbnail images.

In FIG. 9, the thumbnail image SG1 and thumbnail images SG2 and SG3 have the same artist name "Artist". The control unit 10 detects that the thumbnail images SG1, SG2, and SG3 have the same artist name "Artist" using the three different additional data items Fd. Thereafter, the control unit 10 outlines the display area of each of the thumbnail images using, for example, a bold line and displays links between the thumbnail images using line objects.

Thus, the information processing apparatus can display a plurality of thumbnail images corresponding to different music content items Au related to the same artist while displaying links between the thumbnail images. Accordingly, the user can rapidly and accurately find the desired music content items Au related to the desired artist and use those music content items Au.

Note that, in FIG. 9, the thumbnail image indicated by the pointer P serves as a reference thumbnail image. Each of thumbnail images having the same artist name "Artist" as that of the reference thumbnail image is connected to the reference thumbnail image by a line object.

Additionally, in FIG. 9, three thumbnail images having the same artist name "Artist" are present. However, the present exemplary embodiment is not limited thereto. The number of the thumbnail images having the same artist name "Artist" as that of the thumbnail image indicated by the pointer P may be zero, two, or three or more.

Furthermore, the association between the display information items may be made on the basis of the genre "Genre". Alternatively, the association between the display information may be made on the basis of the artist name "Artist" and the genre "Genre". In addition to the artist name "Artist" and the genre "Genre", any item that is an additional data item Fd provided for the music content Au can be used for associating the display information items with each other.

Example (Entire Display Screen is Used as Two Display Regions)

In FIGS. 6 and 9, display information items such as text information items and a thumbnail images corresponding to content items are displayed on the entire display screen serving as one display region. However, in general, when different types of display information item (such as text information items and thumbnail images) are displayed, different display regions are used for increasing the viewability.

In the following example of displaying a list of music content items, the display screen 32G of the LCD 32 is divided into a text pane that displays text information items and an image pane that displays thumbnail images and icons. In the following example, the data, such as a text information item, a thumbnail image, and an icon image, have the same structures and a relationship described in FIGS. 2, 3, and 4.

Figure 10:
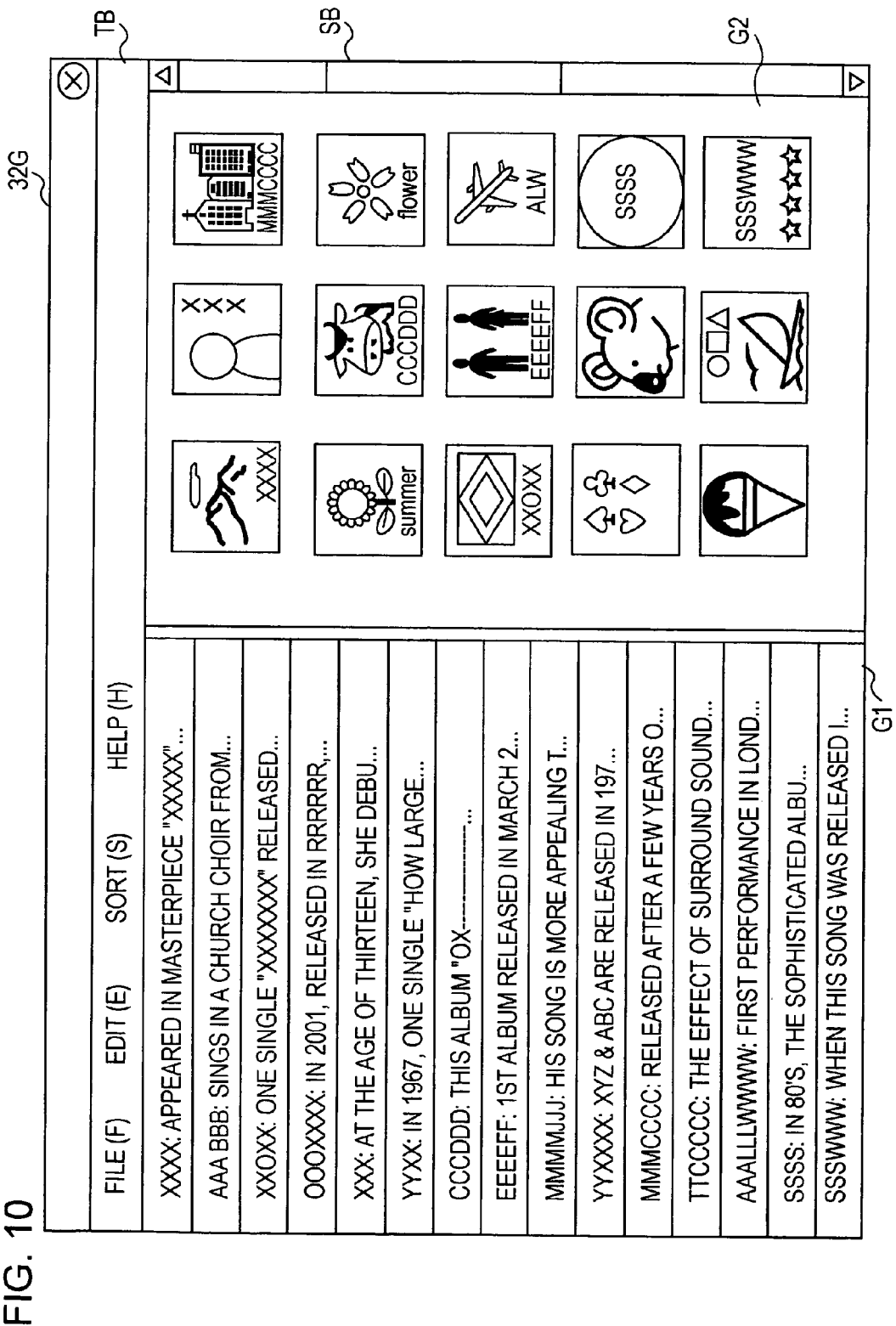
FIG. 10 illustrates an example of a list of music content items on a display screen in which two different types of display information item are placed in two different display regions.

FIG. 10 illustrates an example of a list of music content items displayed by the information processing apparatus according to the present exemplary embodiment. Upon receiving an operation input that instructs to display a list of music content items stored in the recording medium 42 from the operation unit 51, the control unit 10 references the additional data items Fd of music content items stored in the recording medium 42 via the I/F unit 41. The control unit 10 loads information necessary for the display operation into the RAM 13 on the basis of the additional data items Fd. The control unit 10 then displays a list of music content items shown in FIG. 10 on a display screen 32G of the LCD 32 using the information loaded in the RAM 13. Accordingly, the control unit 10 can identify the display positions of display information items on the LCD 32 by using coordinates of the display positions on the LCD 32.

As shown in FIG. 10, the display screen 32G of the LCD 32 includes two panes that display the list of music content items, the tool bar TB used for performing a variety of operations, and the scroll bar SB.

The left pane of the two panes is a text pane G1 that displays text information items in the form of a list. The right pane of the two panes is an image pane G2 that displays thumbnail images arranged in an array. In this example, the thumbnail images represent reduced images of album jackets of compact discs (CDs) storing the music content items Au.

However, the images displayed in the image pane G2 may be icon images corresponding to the music content items Au in place of the thumbnail images. Additionally, when creating the thumbnail images corresponding to the music content items Au, the information processing apparatus may provide one thumbnail image to one song or may provide one thumbnail image to one album.

In FIG. 10, for simplicity, the number of lines of the text information items in the text pane G1 is 15 and the number of the thumbnail images in the image pane G2 is 15. That is, the number of lines of the text information items in the text pane G1 is the same as the number of the thumbnail images in the image pane G2.

The text information items displayed in the text pane G1 have a one-to-one correspondence to the thumbnail images displayed in the image pane G2. When a user moves the scroll bar SB displayed at the rightmost section of the image pane G2 in the vertical direction, the text information items and the thumbnail images simultaneously scroll. If the number of text information items to be displayed is less than or equal to the maximum number of lines of text that can be displayed in the left pane, the scroll bar SB does not appear. Similarly, if the number of thumbnail images to be displayed is less than or equal to the maximum number of thumbnail images that can be displayed in the right pane, the scroll bar SB does not appear.

The information processing apparatus restricts the maximum length of text information to the width of the left pane and, subsequently, displays the text information items. If remaining text that exceeds one line of the left pane exists, the information processing apparatus appends a symbol "..." to the displayed text. If the symbol "..." is displayed, the user recognizes that remaining text exists. If the symbol "..." has the width of one character, the number of characters of the displayed text information item is the maximum number of characters that can be displayed in the width of the left pane minus one.

According to the present exemplary embodiment, the control unit 10 includes a variety of fonts in the ROM 12, and therefore, the information processing apparatus can display the text information items in a variety of ways. However, since the type of font and the size of the font are not essential factors of the present invention, the detailed descriptions are not provided herein.

Usage of Tool Bar (Sorting of Displayed Items)

As shown in FIG. 10, the information processing apparatus displays the list of music content items in which the music content items are displayed in a predetermined order, for example, in the order in which the additional data items Fd were added. The information processing apparatus displays text data corresponding to the music content items in the text pane G1 in the predetermined order. Additionally, the information processing apparatus displays thumbnail images in the image pane G2 in a predetermined order. However, if the information processing apparatus displays the list of music content items in the predetermined order, it may be difficult for the user to find the desired data. To address this issue, in the present exemplary embodiment, as shown in FIG. 11, the user can sort the display information items on the basis of the Time1 and Time 2, which are date and time information items included in the additional data item Fd.

Figure 11:
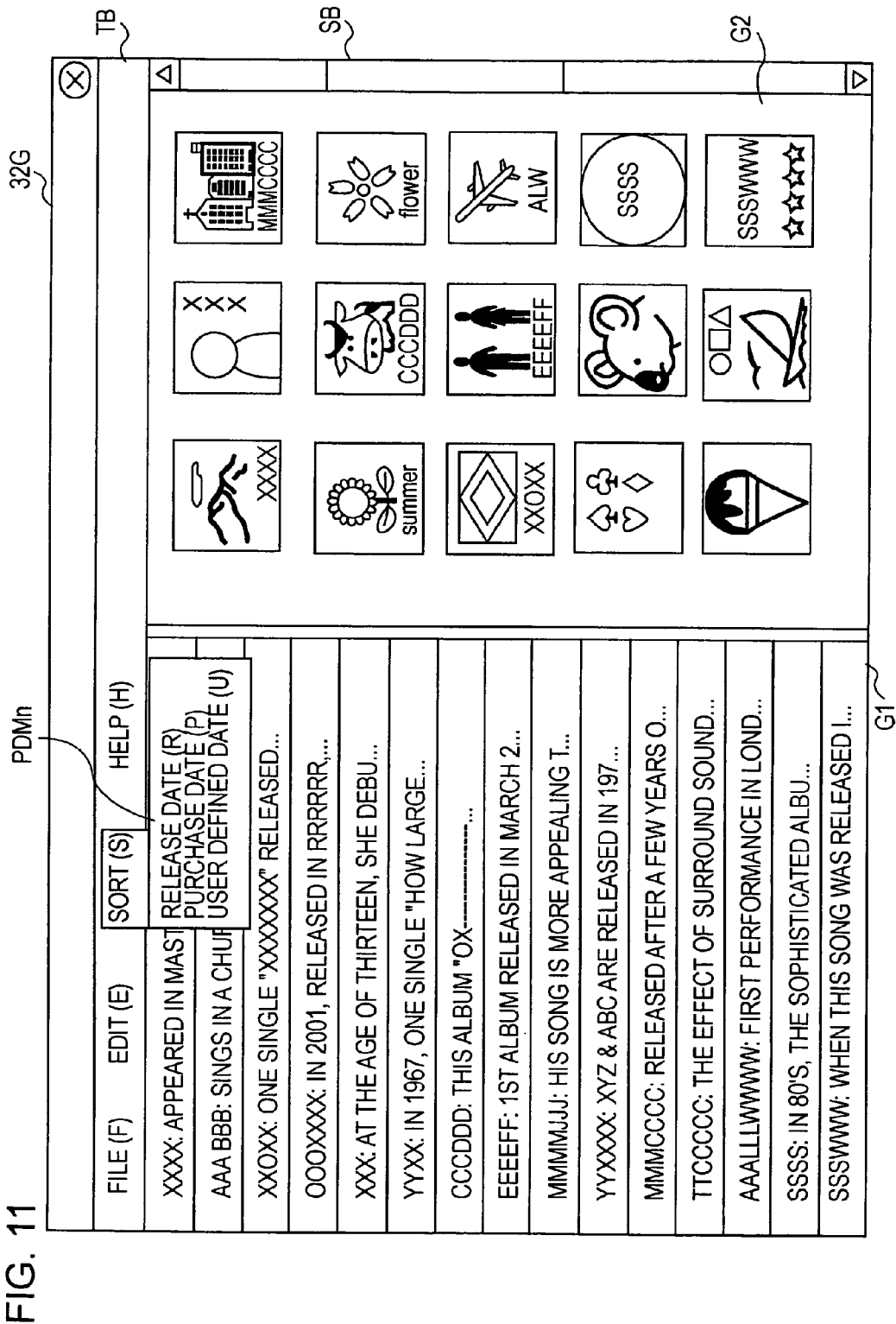
FIG. 11 is a diagram illustrating the sort function of the information processing apparatus shown in FIG. 1.

FIG. 11 is a diagram illustrating the sort function. As shown in FIG. 11, upon expanding a "Sort" menu PDMn in the tool bar TB, the user can select one of the date and time information items contained in the additional data item Fd. The information processing apparatus can sort the list of text in the left pane in the ascending order or the descending order. The menu PDMn may include the selection of the ascending order or the descending order. The user can sort the list of music content items by using the item "release date" or "purchase date" contained in the item "Time" of the additional data item Fd. In the example shown in FIG. 11, the menu items "release date" and "purchase date" are displayed as setting tabs.

For example, when the user selects the item "release date" in the "Sort" menu PDMn, the information processing apparatus sorts the text list in the text pane G1 by using the item "release date" as a sort key. More specifically, the control unit 10 sequentially references the "Time" fields of the additional data items Fd stored in the recording medium 42 to retrieve the date and time data having a character string "@release". Thereafter, the information processing apparatus sorts the additional data items Fd including the date and time data having a character string "@release" in the ascending order or the descending order. At that time, the information processing apparatus uses the RAM 13 as a work area. Subsequently, the control unit 10 sorts the text information items in the order of earliest to latest release date and displays the text list in the text pane G1. If the text list has the number of lines greater than or equal to the number of a maximum display lines, the control unit 10 displays the tool bar TB and displays only the lines of text corresponding to the position of the tool bar TB.

The information processing apparatus can sort the text list using a field other than the "Time" field as a sort key. For example, the information processing apparatus can sort the text list using the "Text" field itself. In this case, the sorted text list is displayed, for example, in alphabetic order or in the Japanese syllabary order.

After displaying the text list in the text pane G1, the control unit 10 reads out the thumbnail images corresponding to the text from the recording medium 42 and displays the thumbnail images in the image pane G2. The thumbnail images can be displayed in any order. The thumbnail images may be displayed from the upper left to the right, and subsequently, may be displayed in the next row. Alternatively, the thumbnail images may be displayed from the upper left in the downward direction, and subsequently, may be displayed in the next column. Furthermore, the thumbnail images may partially overlap.

The "Edit" menu in the tool bar TB allows the user to edit (input, update, or copy) the line of text selected by pointing the line of text using the pointer P. In this editing operation, the "Text" field and the "Time" field corresponding to the line of text can be updated. Also, the additional data Fd corresponding to the line of text and the related content item can be deleted.

The "File" menu in the tool bar TB allows the user to select one of the following functions: grouping and storing the additional data items Fd, printing the text list, and ending the execution of this browser application.

While the present exemplary embodiment has been described with reference to the control unit 10 sorting the thumbnail images on the basis of the date and time information items included in the additional data items Fd, the present exemplary embodiment is not limited thereto. For example, if the thumbnail image includes a date and time information item, the control unit 10 can sort the thumbnail images on the basis of this date and time information item. That is, the control unit 10 can use information included in data item to be sorted as a sort key or can use a date and time information item included in the additional data item Fd corresponding to data item to be sorted.

Link Between Display Information Item in Text Pane G1 and Display Information Item in Image Pane G2

An exemplary display screen of the link between a display information item in the text pane G1 and a display information item in the image pane G2 is described next with reference to FIG. 12.

Figure 12:
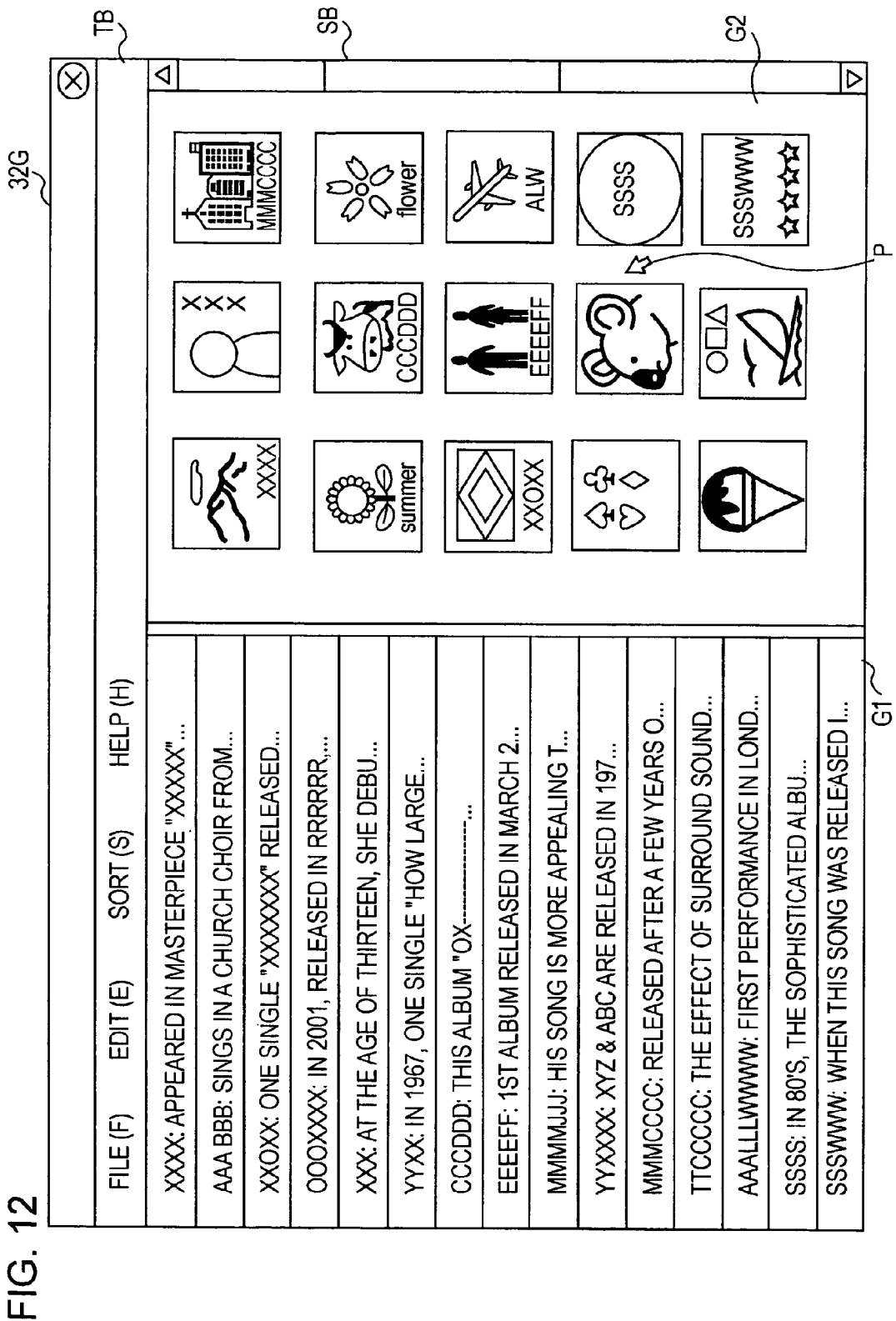
FIG. 12 is an example of a list of music content items on a display screen having two display regions and a displayed pointer P.

FIG. 12 is a diagram in which the list of music content items is displayed on the display screen 32G of the LCD 32. In FIG. 12, a user moves the arrow pointer P in order to select one of the thumbnail images. The screen image does not change unless the pointer P overlaps any one of the thumbnail images.

The pointer P has the shape of an arrow. The control unit 10 identifies the display information item indicated by the tip of the arrow as the display information item indicated by the pointer P. However, the shape of the pointer is not limited thereto. The pointer P may have any shape. It is desirable that the pointer P has a shape so that the position of the pointer P is clearly detectable by the eye.

Figure 13:
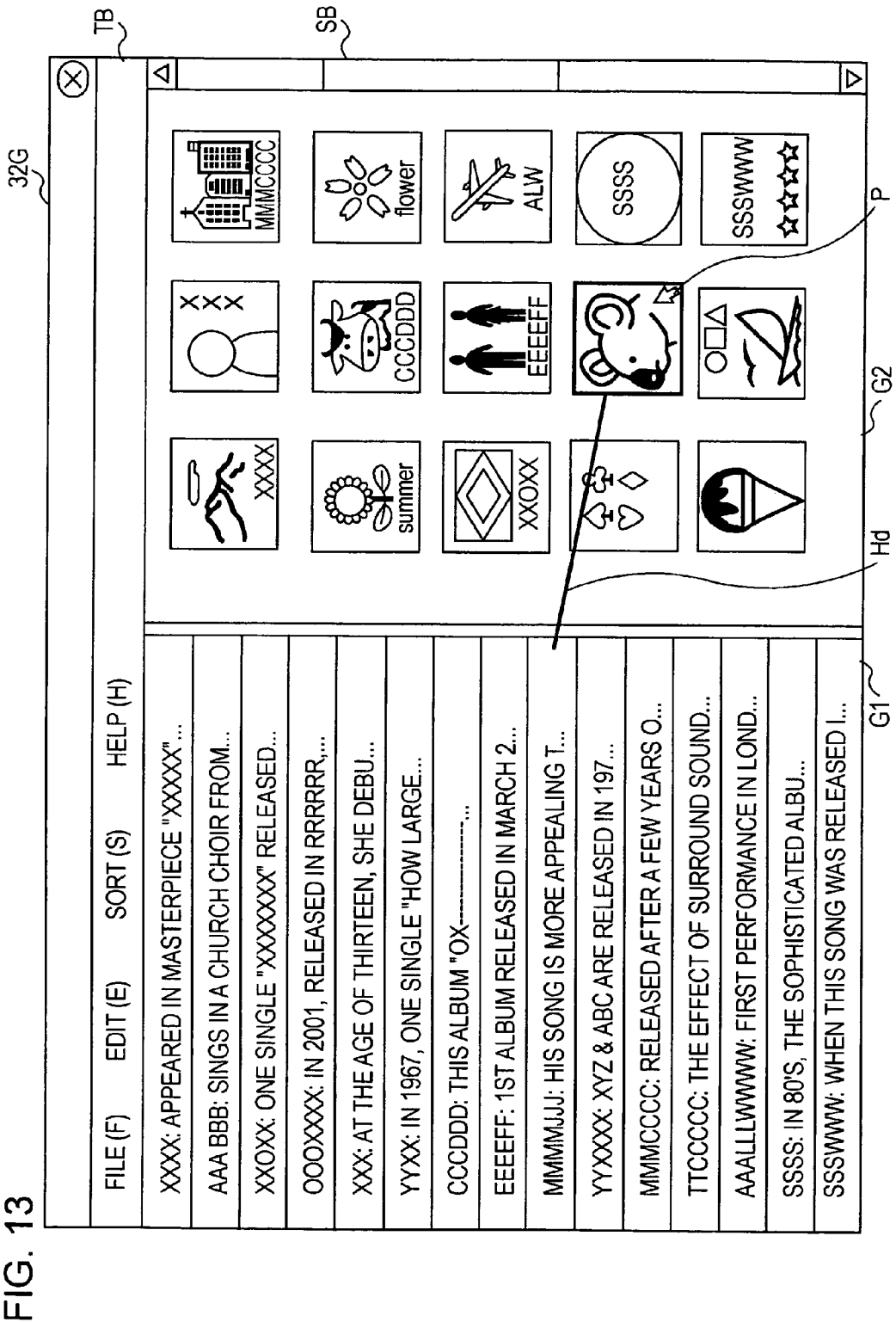
FIG. 13 is an example of a list of music content items on a display screen having two display regions and a displayed link Hd.

FIG. 13 is a diagram in which the tip of the pointer P overlaps a second thumbnail image from the bottom in the middle column of the thumbnail images. The user simply moves the pointer P in the display area of the desired thumbnail image. No click operation is needed.

When the pointer P overlaps the desired thumbnail image, the thumbnail image is outlined with a bold line or a colored line. Therefore, the user can recognize that the thumbnail image is selected by the eye. The selected thumbnail image can be emphasized in a variety of ways. For example, the information processing apparatus can gray out thumbnail images that are not selected and display the selected thumbnail image with the original color. Alternatively, the information processing apparatus can enlarge the selected thumbnail image to a size larger than that of another thumbnail image.

After the thumbnail image is selected, the information processing apparatus displays a line or a curve between the selected thumbnail image and a line of text associated with this thumbnail image. Since the information processing apparatus links the thumbnail image to the corresponding text information item, the user can view the correspondence between the thumbnail image and the text information item. That is, if the pointer P overlaps a second thumbnail image from the bottom in the middle column of the thumbnail images displayed in the image pane G2, the control unit 10 outlines the periphery of the thumbnail image with a bold line or a colored line. Simultaneously, the control unit 10 displays a line Hd between the display area of the selected thumbnail image and the display area of the text item corresponding to the selected thumbnail image. In FIG. 13, the text item corresponding to the selected thumbnail image is a text information item displayed in a seventh line from the bottom in the text pane G1.

Thus, the user can easily find the text information item associated with the desired music content item.

In addition, the information processing apparatus can change the color of the linked text information item so that the user can easily find the text information from among all the lines of text.

Figure 14:
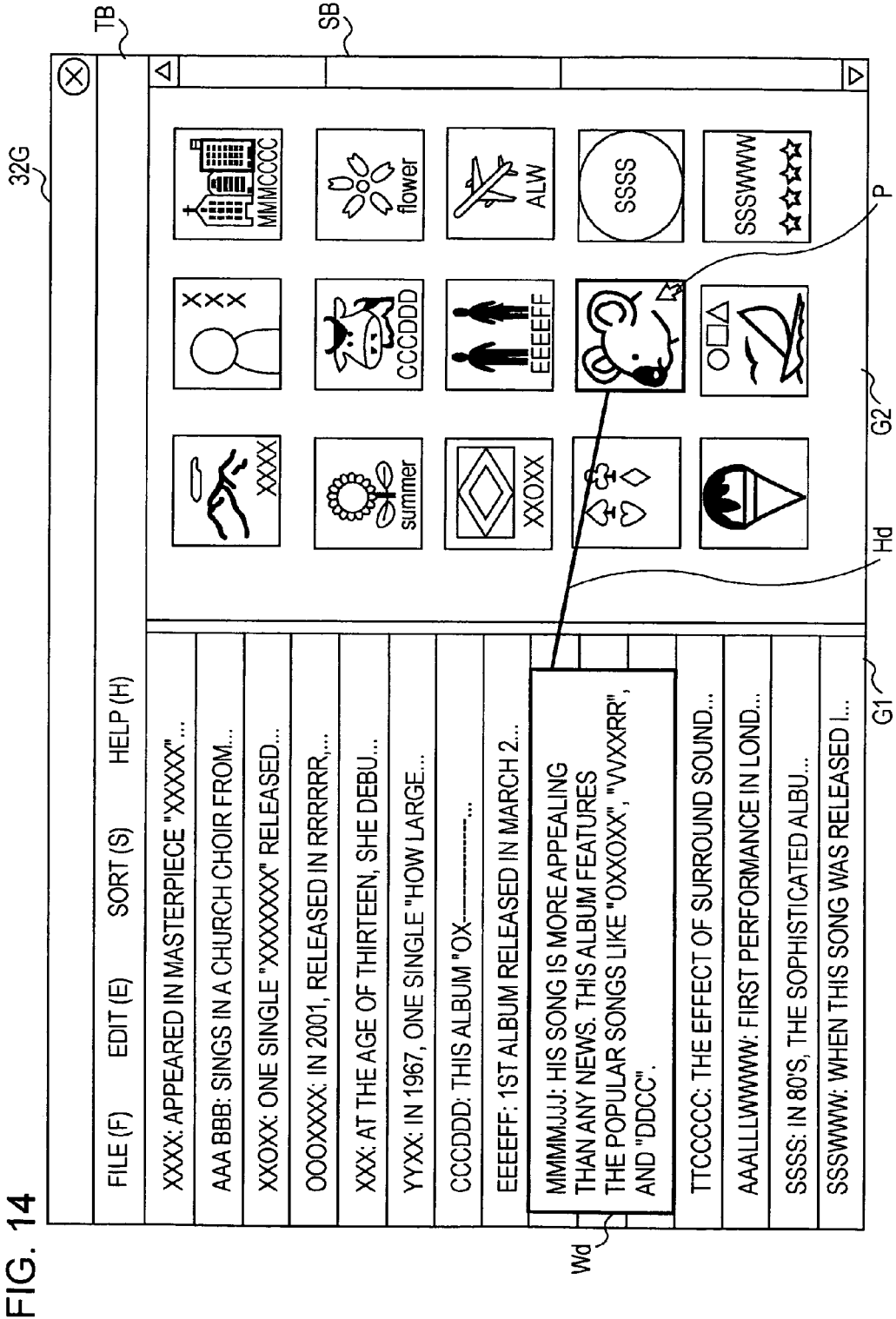
FIG. 14 is an example of a list of music content items on a display screen having two display regions in which all the text for a music content item is displayed.

FIG. 14 is a different diagram in which a thumbnail image indicated by the pointer P and the corresponding text information item are displayed. The information processing apparatus can display the full text of the text information item corresponding to the thumbnail image indicated by the pointer P by opening a small window in the vicinity of the line of text. Alternatively, when the user clicks a mouse button once in the state shown in FIG. 13, the information processing apparatus may display the full text, as shown in FIG. 14. In addition, an optional menu may be provided in order to determine whether the full text is displayed or not.

Subsequently, when the user clicks the mouse button once or double-clicks in the state shown in FIG. 13 or 14, the control unit 10 performs control so that the music content item corresponding to the thumbnail image or the line of text is read out of the recording medium 42. Thereafter, the control unit 10 delivers the readout music content item to the audio processing unit 21 of the audio output unit 20 and performs control so that the music content item is played back.

In this way, the user can reliably find the thumbnail image and the text information item corresponding to the thumbnail image without reading the wrong text information item. Additionally, the user can rapidly and accurately find the desired music content item on the basis of both a thumbnail image and a text information item corresponding to the thumbnail image to play back the desired music content item Au.

In the present exemplary embodiment, the information processing apparatus displays the full text of the text information item corresponding to the selected thumbnail image. However, the present invention is not limited thereto. For example, even when the full text of the selected display information is not displayed, the information processing apparatus can display the full text of the selected display information. That is, the information processing apparatus can expand the display area of the selected display information item. Additionally, the information processing apparatus can expand the display area of a display information item corresponding to the selected display information. By expanding the display area, the information processing apparatus can increase the amount of information to be displayed.

Detailed Operation of Information Processing Apparatus

Figure 15:
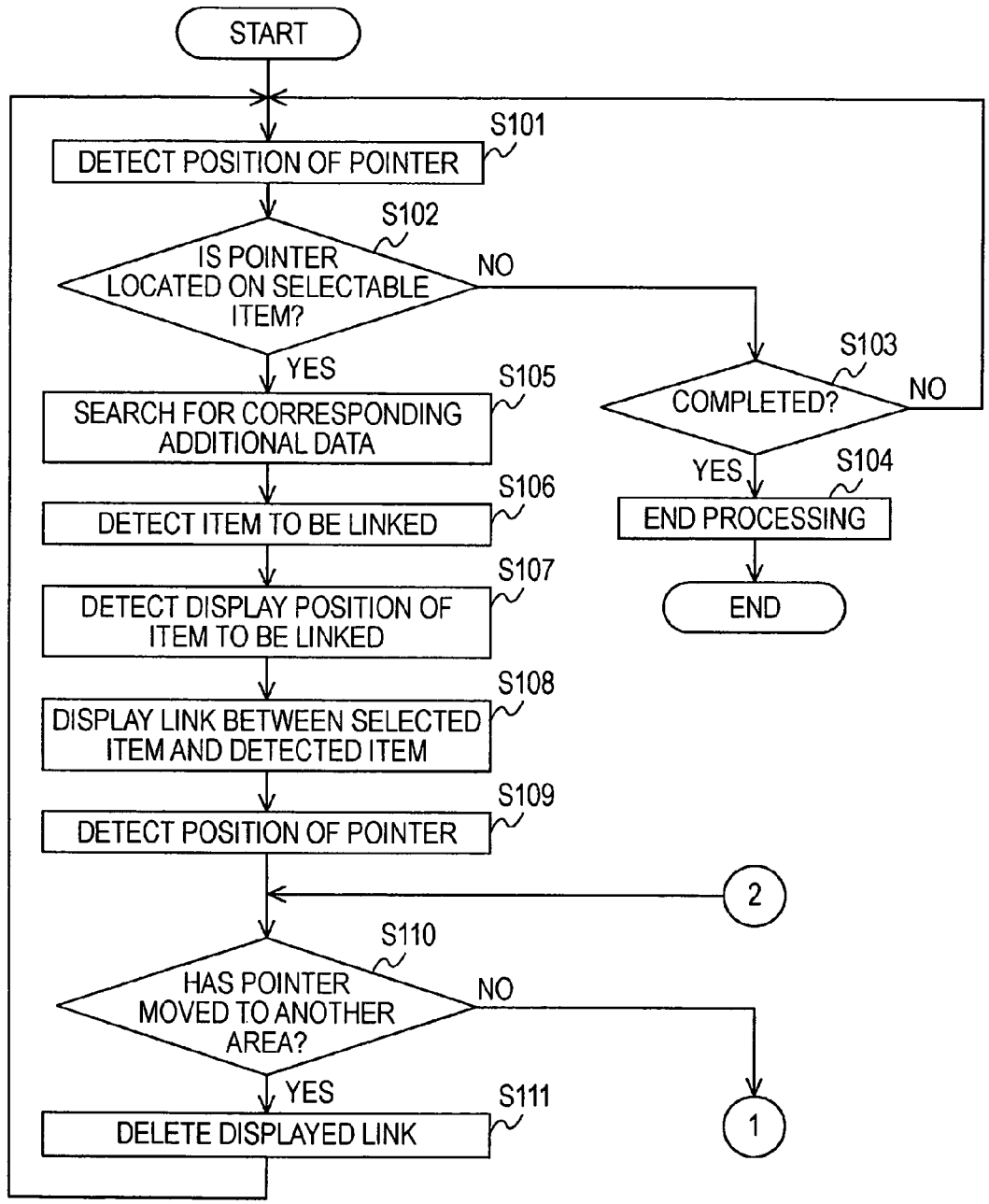
FIG. 15 is a flow chart illustrating the process primarily performed by a control unit 10 after the list of music content items is displayed.
Figure 16:
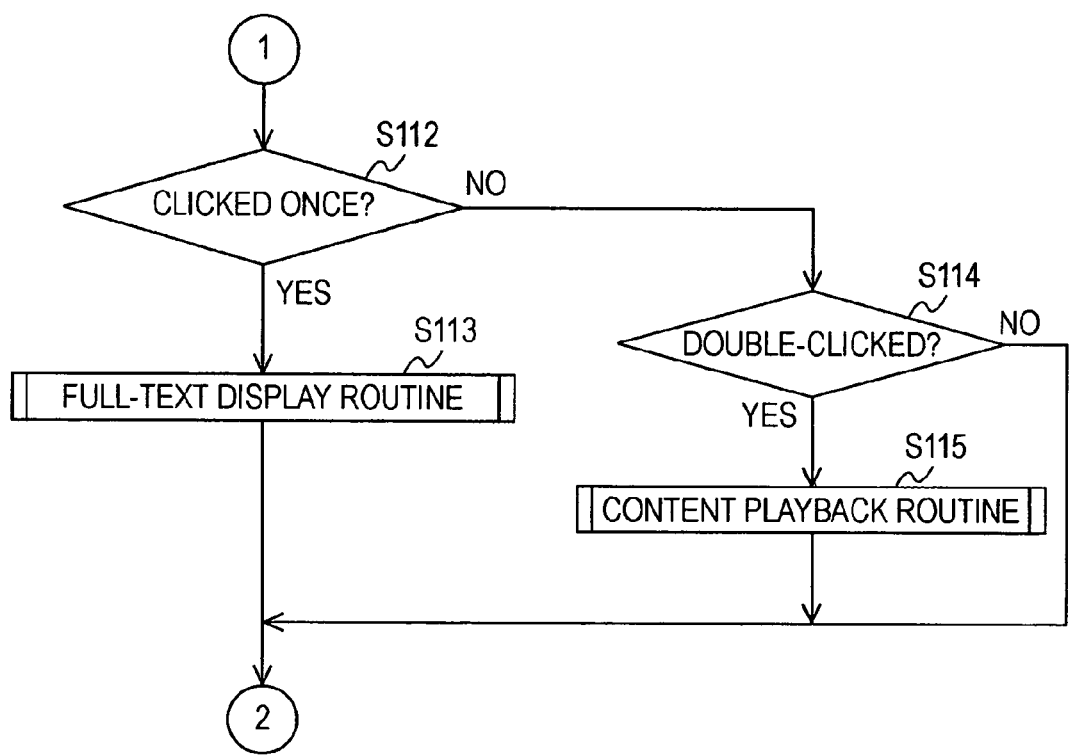
FIG. 16 is a continuation of the flow chart of FIG. 15.

The operation of the control unit 10 is described next after the list of music content items Au is displayed. FIGS. 15 and 16 are flow charts of the procedures performed primarily by the control unit 10 after the list of music content items Au is displayed.

The procedures shown in FIGS. 15 and 16 are applicable both when the entire display screen 32G is used as one display region, as shown in FIG. 6, and when the entire display screen 32G is used as two or more display regions, as shown in FIGS. 10 to 14.

Here, for simplicity, the text information item and the thumbnail image are displayed on the display screen 32G and the pointer P points the thumbnail image, as shown in FIGS. 6, 13, and 14.

After the list of music content items is displayed on the display screen 32G of the LCD 32, the control unit 10 performs the following steps.

step S101: The control unit 10 detects the position of the pointer P on the display screen 32G.

step S102: The control unit 10 determines whether the pointer P is located on one of selectable items, that is, one of the display areas of selectable thumbnail images.

The control unit 10 holds the display positions of the thumbnail images on the display screen 32G. Accordingly, the control unit 10 can determine whether the pointer P is located inside one of the display areas of the thumbnail images.

step S103: Upon determining that the pointer P is not located inside any one of the display areas of the thumbnail images, the control unit 10 determines whether the end operation of displaying the list of music content items Au is performed or not. For example, the end operation is input by a user by placing the pointer P on the "X" displayed in the upper right corner of the display screen 32G and clicking a mouse. Thus, the end operation is input to the information processing apparatus.

If the control unit 10 determines that the end operation of displaying the list of music content items has not been input, the control unit 10 repeats the processing starting from step S101.

step S104: If it is determined at step S103 that the end operation has been input, the control unit 10 performs a series of end operations (such as deletion of the list of music content items Au).

step S105: Upon determining at step S102 that the pointer P is placed inside one of the display areas of the thumbnail images, the control unit 10 searches for the additional data item Fd on the basis of the thumbnail identifier IID of the selected thumbnail image.

step S106: The control unit 10 detects a "Text" field in the obtained additional data item Fd corresponding to the selected thumbnail image.

step S107: The control unit 10 detects the display position of the text information item in the detected "Text" field. Since the control unit 10 holds the display positions of the text information items, the control unit 10 can identify the display position of the target text information.

step S108: The control unit 10 directly links the display area of the thumbnail image indicated by the pointer P to the display area of the text information item corresponding to that thumbnail image using a display object, such as a line or a curve, and displays the linkage state. In the present exemplary embodiment, the control unit 10 displays the line Hd. The control unit 10 performs control so that the thumbnail image indicated by the pointer P is outlined with a bold line and the color of the corresponding text information item is changed. Furthermore, when the full text of the text information item is to be displayed, as shown in FIG. 14, the control unit 10 performs processing necessary for displaying the full text in this step. However, the processing necessary for displaying the full text may be performed at step S107 or step S109.

step S109: The control unit 10 detects the position of the pointer P on the display screen 32G.

step S110: The control unit 10 determines whether the pointer P has moved to another area.

step S111: Upon determining that the pointer P has moved from the display area of the thumbnail image to another area, the control unit 10 deletes the display of the link performed at step S108. Thereafter, the control unit 10 repeats the processing starting from step S101.

step S112: Upon determining that the pointer P has not moved from the display area of the thumbnail image to another area, the control unit 10 makes the determination at step S112 shown in FIG. 16. That is, the control unit 10 determines whether the mouse button is clicked once.

step S113: Upon determining that the mouse button is clicked once, the control unit 10 displays the full text of the text information corresponding to the thumbnail image indicated by the pointer P. Thereafter, the control unit 10 repeats the processing starting from step S110 shown in FIG. 15.

step S114: Upon determining that the mouse button is not clicked once, the control unit 10 determines whether the mouse button is double-clicked.

step S115: Upon determining that the mouse button is double-clicked, the control unit 10 reads out the corresponding music content item from the recording medium 42 on the basis of the additional data item Fd corresponding to the thumbnail image indicated by the pointer P. Thereafter, the control unit 10 delivers the readout music content item to the audio processing unit 21 of the audio output unit 20 and performs control so that the music content item is played back.

The control unit 10 references the FID or the FName with a path in the corresponding additional data item Fd and reads out the corresponding music content item from the recording medium 42 to play back the music content item. The control unit 10 references the extension of the FName or information embedded in the header of the music content item to determine the playback program.

After the playback of the music content item is completed or when a cancel operation of playback is performed, the control unit 10 stops the playback program and repeats the processing starting from step S110 shown in FIG. 15. If it is determined at step S114 that the mouse button is not double-clicked, the control unit 10 repeats the processing starting from step S110 shown in FIG. 15.

In this way, the information processing apparatus according to the present exemplary embodiment displays the thumbnail image and the text data corresponding to each of the music content items on the display screen 32G. The information processing apparatus can clearly show the correspondence between the thumbnail image selected by the user and the corresponding text information item to the user. The user can clearly view both the thumbnail image and the text information item so as to find the music content item quickly and easily. Thereafter, the user can play back the music content item.

The flow chart shown in FIGS. 15 and 16 is only an example. The control unit 10 may perform processing in order to play back a music content item according to a different procedure.

For example, as shown in FIG. 9, even when thumbnail images of a plurality of different music content items Au are displayed, the links can be displayed by performing processing similar to the processing shown by the flow chart in FIG. 16. In this case, if the control unit 10, at step S110, determines that the pointer P has not been moved to another area, the processing can proceed to steps S114 and S115 without executing steps S112 and S113 shown in FIG. 16.

First Modification

Figure 17:
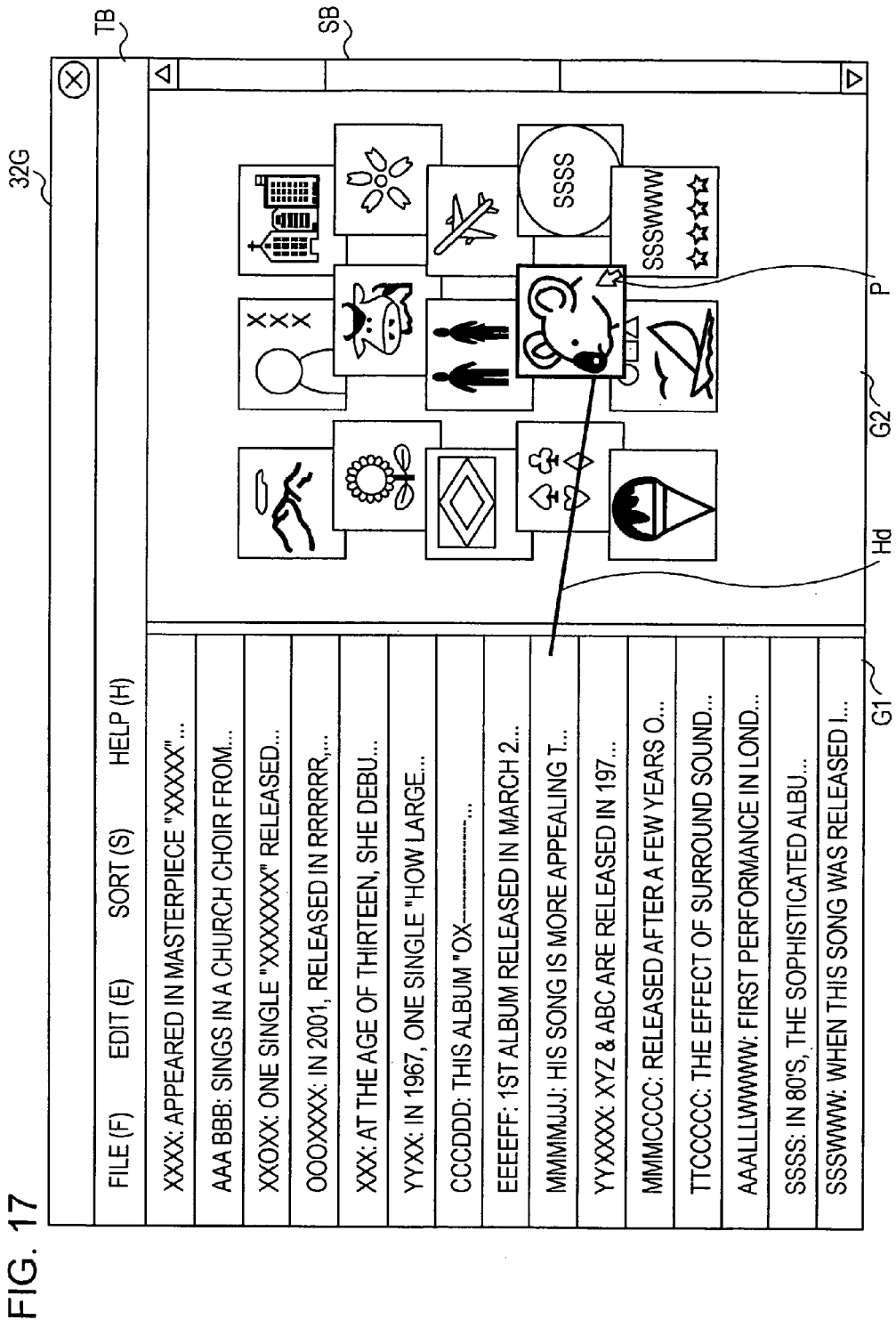
FIG. 17 is another example of a list of music content items on a display screen having two display regions.

Some of the modifications of the foregoing embodiment are described next. FIG. 17 illustrates an example of a screen display of the information processing apparatus when the screen has a low resolution like a television screen so that a user cannot sufficiently differentiate a small thumbnail image from another. That is, by relatively enlarging a thumbnail image, the viewability is attempted to be improved.

In such a case, if the number of displayed thumbnail images is decreased, a user needs to frequently operate the tool bar TB. This frequent operation of the tool bar TB decreases the operability of the information processing apparatus. Accordingly, by displaying the thumbnail images so that the thumbnail images overlap each other, the display area of each thumbnail image is increased. This display method allows the information processing apparatus to display the thumbnail images while maintaining excellent viewability even when the screen has a low resolution.

Basic operations are the same as those in the above-described embodiment. However, when the pointer P overlaps viewable part of any one of the thumbnail images, the information processing apparatus displays that thumbnail image on the uppermost layer. That is, the thumbnail image displayed on the uppermost layer is entirely displayed without being hidden by other thumbnail images.

Subsequently, like the above-described embodiment, the information processing apparatus links the thumbnail image displayed on the uppermost layer to the corresponding line of text by using a line object.

While the first modification has been described with reference to the information processing apparatus displaying the entire portion of the selected thumbnail image, the present invention is not limited thereto. Alternatively, when part of display information item associated with the selected display information item is hidden by different display information, the information processing apparatus may display the entire portion of the display information item associated with the selected display information item. For example, when part of text information item corresponding to the thumbnail image selected by the pointer P is hidden by a different text information item, the information processing apparatus can display the entire portion of the corresponding text information item.

That is, when either or both of the selected display information item and the display information item associated with the selected display information item are partially hidden by a different display information item, the information processing apparatus can place the display information item on the uppermost layer so that the entire display information item is displayed.

Second Modification while the foregoing embodiment has been described with reference to a mouse or a touch pad widely used in personal computers as a pointing device, the present invention is not limited thereto. For example, arrow keys "↑", "↓", "←", and "→" for moving a cursor in the vertical and horizontal directions may be used in place of a pointing device. The arrow keys have been widely used in keyboards of personal computers, remote controls of a variety of electronic apparatuses, and operation buttons of cell phones. By using the arrow keys, a thumbnail image can be selected.

For example, as shown in FIGS. 6, 9, or 10, when a list of music content items Au is displayed, the information processing apparatus focuses the thumbnail image located in the upper left of the image pane G2 by default. In order to focus a thumbnail image, the information processing apparatus may place a cursor on the thumbnail image. At that time, in order for a user to clearly recognize that the cursor is placed on the thumbnail image, the information processing apparatus, for example, may outline the thumbnail image with a bold line or may gray out unselected thumbnail images. Furthermore, when the upper left thumbnail image is focused, the information processing apparatus may link the upper left thumbnail image to the corresponding line of text. However, at this point of time, the link is not necessarily needed.

Subsequently, the user selects a thumbnail image to be focused using the arrow keys. For example, when the user depresses the right arrow key "→" once, the display of the upper left thumbnail image turns back to a normal display as for the other thumbnail images. At that time, the line Hd between the upper left thumbnail image and the text information item corresponding to the upper left thumbnail image is deleted. Thereafter, the thumbnail image on the right of the upper left thumbnail image is focused and is emphasized. Simultaneously, the information processing apparatus displays a link between that thumbnail image and the line of text corresponding to the thumbnail image. Furthermore, when the user depresses the right arrow key "→", the next right thumbnail image is focused and is emphasized.

In this case, the information processing apparatus displays three thumbnail images in one row in the list of music content items Au shown in FIG. 10. Accordingly, when the cursor is located on the rightmost thumbnail image and the right arrow key "→" is depressed, the information processing apparatus moves the focus onto the leftmost thumbnail image in the next row. In addition, when the cursor is located on the leftmost thumbnail image and the left arrow key "←" is depressed, the information processing apparatus moves back the focus onto the rightmost thumbnail image in the previous row.

The up and down arrow keys "↑" and "↓" provide the same operation as described above. However, when a thumbnail image at the rightmost, leftmost, uppermost, or lowermost position in the image pane G2 is focused and the arrow key that moves the cursor to outside the image pane G2 is depressed, the movement of the focus can be determined depending on an application.

For example, in FIG. 10, when the upper left thumbnail image is focused and the up arrow key "↑" or the left arrow key "←" is depressed, the information processing apparatus can scroll down the thumbnail images by one row and display the previous thumbnail image. In such a case, the information processing apparatus also can scroll down the thumbnail images by one page so that all the thumbnail images are replaced with new thumbnail images. In either case, the corresponding lines of text are also scrolled in accordance with this operation.

It is difficult that a mouse is connected to compact apparatuses, such as cell phones, personal digital assistants (PDAs), or remote controls of TV sets. Therefore, by assigning keys for moving a cursor to keys for operating the apparatus, the present exemplary embodiment can be applied to compact information processing apparatuses including such mobile devices.

Furthermore, even when the thumbnail images are not arranged in an array, as shown in the first modification described with reference to FIG. 17, a thumbnail image to be focused is easily selected using the arrow keys. For example, when some thumbnail image is focused and the right arrow key "→" is depressed to a plurality of candidate thumbnail images, a thumbnail image located closest to the horizontal line of the focused thumbnail image or a thumbnail image located closest to the focused thumbnail image can be selected.

Third Modification

Figure 18:
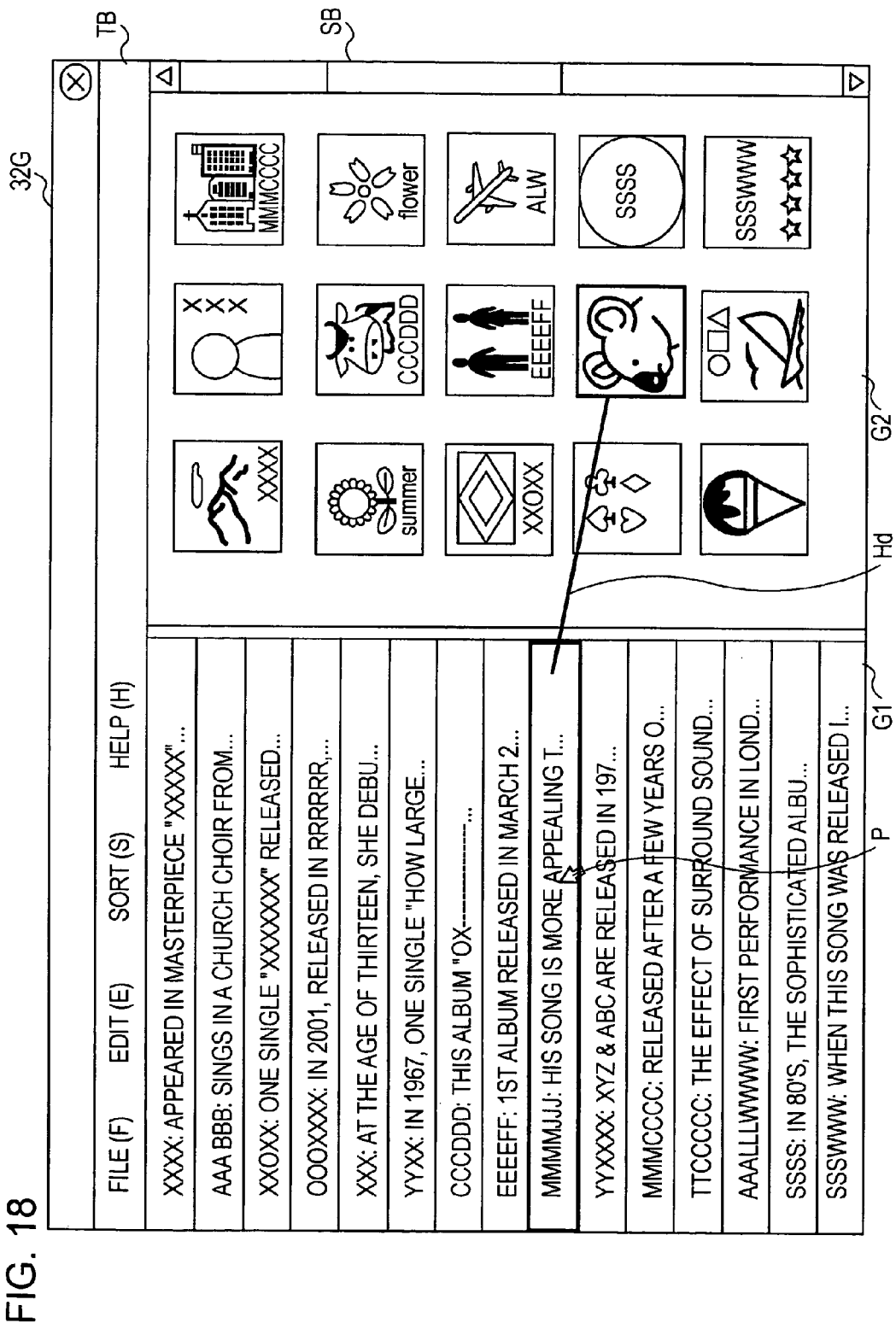
FIG. 18 is another example of a list of music content items on a display screen having two display regions.

As shown in FIG. 18, when the pointer P overlaps one of the lines of text displayed in the text pane G1, the information processing apparatus may display the link between the line of text and the corresponding thumbnail image. In addition, a display window may be provided in the vicinity of the focused line of text and the full text may be displayed in that window.

Even in such a case, the basic operation is similar to that described in FIGS. 15 and 16. However, the execution timings of displaying the full text of the text information are different. For example, as shown in FIG. 18, if the pointer P is allowed to be placed on a text information item and the pointer P is placed on the display area of a text information item, the information processing apparatus can automatically display the full text of the text information item on which the pointer P is placed. Alternatively, when a one-click operation is performed, the information processing apparatus can display the full text of the text information on which the pointer P is placed. Accordingly, the timings of performing steps S112 and S113 shown in FIG. 16 are changed.

Fourth Modification

In the above-described embodiment, an image object (such as a line image) directly links the selected thumbnail image and the text information item corresponding to this thumbnail image, links the selected thumbnail image and a thumbnail image corresponding to this thumbnail image, or links the selected text information item and a thumbnail image corresponding to the selected text information item. However, the used image object is not limited to the line image. For example, the used image object may be an animation or a figure of a human arm, an animation or a figure of a bridge, or any animation image of a geometric pattern.

Furthermore, a variety of types of linkage method can be provided. For example, the image object may gradually extend from the selected thumbnail image to the text information item corresponding to the selected thumbnail image when displaying the link.

Additionally, in place of displaying a link between the corresponding images with an image object, the information processing apparatus can show the correspondence by blinking the selected thumbnail image and the text information item corresponding to the selected thumbnail image. That is, the information processing apparatus can display the selected thumbnail image and the text information item corresponding to the selected thumbnail image so that the color or the luminance of the selected thumbnail image and the text information item corresponding to the selected thumbnail image is different from that of other thumbnail images and text information items.

Furthermore, if the text information item corresponding to the selected thumbnail image is not displayed in the display screen 32G, the information processing apparatus can automatically scroll only the display information items in the text pane G1 so that the corresponding text information item appears in the text pane G1. Conversely, if the thumbnail image corresponding to the selected text information item is not displayed in the display screen 32G, the information processing apparatus can automatically scroll only the display information items in the image pane G2 so that the corresponding thumbnail image appears in the image pane G2.

In the above-described embodiment, the display region is divided into two panes (i.e., the text pane G1 and the image pane G2). However, the present exemplary embodiment is not limited thereto. For example, three or more display regions can be provided on the display screen of the display element. Thereafter, three or more data groups can be displayed in these regions, and the correspondence between the display information items in the data groups can be displayed.

Accordingly, the display information item in the displayed data group is not limited to a text information item, a thumbnail image, and an icon image. For example, the present exemplary embodiment is applicable to the case where a plurality of display information groups are displayed in the different display regions thereof, such as the case where a plurality of text information groups are displayed and the case where a thumbnail image group and an icon group are separately displayed. In addition, when the object to be played back is a video content item, the correspondence can be visualized to users by displaying a text information item, a thumbnail image, an icon image, or an animation corresponding to the video content item.

Furthermore, while the foregoing embodiment has been described with reference to the case where the text information items and the thumbnail images corresponding to the music content items Au are displayed, the present invention is not limited thereto. For example, the foregoing embodiment can be applied to the case where the video content items Vd and a variety of display information items corresponding to the video content items Vd are displayed and the case where the game programs Gm and a variety of display information items corresponding to the game programs Gm are displayed in the same way.

In recent years, text content items having a relatively large amount of data (such as cartoons or novels) have been distributed in addition to the above-described content items. The present invention can be applied to the case where display information items related to such a variety of content items are displayed.

Application to Program

In the information processing apparatus according to the above-described embodiment, the control unit 10 provides the main function. Accordingly, a variety of functions provided by the control unit 10 can be achieved by a program or software running on the control unit 10. More specifically, by achieving a program corresponding to the flow chart shown in FIGS. 15 and 16, a program according to the embodiment of the present invention, i.e., a program functioning as a browser or a viewer can be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for displaying information about a plurality of content files in a display area by displaying display information items associated with the content files, the information processing apparatus comprising:
a recording medium storing information relating to a plurality of content files, the information comprising, for at least one content file, data of the content file and a data structure storing additional data about the content file, the additional data comprising an identifier for the content file and information identifying at least one display information item associated with the content file;
a display unit configured to display in the display area, for the plurality of content files, a plurality of display information items each corresponding to a content file, and an indicator for indicating that one of the display information items is currently selected in the display area, at least two of the display information items being associated with a first content file, a first display information item of the plurality of display information items being a text information item associated with the first content file and a second display information item of the plurality of display information items being an image information item associated with the first content file, wherein the additional data of the data structure associated with the first content file identifies the text information item and the image information item;
an operation unit; and
a control unit configured to
receive an instruction for updating a current selection of the indicator such that a display information item of the plurality of display information items is selected,
determine, when the indicator selects a display information item of the plurality of display information items, a relationship between the selected display information item and at least one other display information item that is associated with a same content file of the plurality of content files as the selected display information item, wherein determining the relationship comprises:
accessing the additional data of the data structure for the content file corresponding to the selected display information item to determine whether there is at least one other display information item associated with the content file, and
when there is at least one other display information item associated with the content file, identifying the at least one other display information item from the additional data for the content file, and
when there is at least one other display information item associated with the same content file as the selected display information item, display, in the display area, an image object indicating the relationship between the selected display information item and the at least one other display information item determined to have the relationship with the selected display information item.

2. The information processing apparatus according to claim 1, wherein the control unit further determines a second relationship between the selected display information item and at least one second display information item associated with a different content file than the selected display item on the basis of whether the selected display information item and the at least one second display information item indicate that respective content files belong to a same category, and displays the second relationship in the display area,
wherein determining the second relationship comprises accessing the additional data of the data structure for at least one content file corresponding to the at least one second display information item.

3. The information processing apparatus according to claim 1, wherein, when displaying a plurality of types of display information item related to the content files, the control unit displays the display information items in different display regions of the display area on the basis of the type of display information item.

4. The information processing apparatus according to claim 1, wherein the control unit is adapted to display the image object to display a link between the selected display information item and another display information item determined to have the relationship with the selected display information item using a line between the selected display information item and the other display information item.

5. The information processing apparatus according to claim 1, wherein date and time information is associated with each of the plurality of display information items, the date and time information being at least a portion of the additional data stored in the data structure and wherein the control unit sorts the plurality of display information items in the display area on the basis of date and time information in response to an operation input to the operation unit and performs control so that sorted display information items are displayed in the display area.

6. The information processing apparatus according to claim 1, wherein the control unit is adapted to display the image object by enlarging graphics associated with the selected display information item and the at least one display information item determined to have the relationship with the selected display information item.

7. The information processing apparatus according to claim 1, wherein, when one of the selected display information item and the at least one other display information item determined to have the relationship with the selected display information item partially overlaps another of the selected display information item and the at least one display information item, the control unit controls the display unit to display the entire portion of an overlapped display information item by moving the overlapped display information item in the display.

8. The information processing apparatus according to claim 1, further comprising:
   a playback unit configured to play back a content file with which a display information item is associated;
   wherein, when a predetermined input operation is performed on the operation unit with respect to the selected display information item, the control unit determines a detected content file to be played back on the basis of the additional data of the data structure associated with the at least one of the selected display information item and the at least one display information item determined to have the relationship with the selected display information item and controls the playback unit to play back the detected content file.

9. The information processing apparatus of claim 1, wherein a content file is a song file, and a first display information item displayed in the display area associated with the song file is an image of an album cover and a second display information item displayed in the display area associated with the song file is text of an artist name for the sound file, the text being stored in the additional data of the data structure for the content file,
   wherein when the image of the album cover is the selected display information item, the image object indicates the relationship between the image of the album cover and the text of the artist name 10. A method for displaying information about a plurality of content files in a display area by displaying display information items associated with the content files, the method comprising:
   (a) retrieving from a recording medium information regarding a plurality of content files, the information for each content file comprising a data structure storing additional data about the content file, the additional data comprising an identifier for a file and information identifying at least one display information item associated with the content file;
   (b) displaying, on a display unit, a plurality of display information items each associated with one of the plurality of content files and an indicator for indicating that one of the display information items is currently selected in the display area, at least two of the display information items being associated with a first content file, a first display information item of the plurality of display information items being a text information item associated with the first content file and a second display information item of the plurality of display information items being an image information item associated with the first content file, wherein the additional data of the data structure that stores additional data about the first content file identifies the text information item and the image information item;
   (c) receiving, from an operation unit, an instruction for updating a current selection of the indicator;
   (d) determining whether the indicator selects a display information item of the plurality of display information items displayed on the display unit;
   (e) determining a relationship between a selected display information item and at least one other display information item that is associated with a same content file of the plurality of content files as the selected display information item on the basis of the determination result in step (d), the determining of act (e) comprising accessing the additional data of the data structure for the content file corresponding to the selected display information item to determine whether there is at least one other display information item associated with the content file and, when there is at least one other display information item associated with the content file, identifying the at least one other display information item from the additional data for the content file; and
   (f) when there is at least one other display information item associated with the same content file as the selected display information item, displaying an image object indicating the relationship between the selected display information item and the at least one other display information item determined to have the relationship with the selected display information item on the basis of the determination result in step (e).

11. At least one non-transitory computer-readable medium storing a computer program executable by an information processing apparatus, the computer program comprising computer instructions to cause a computer to execute a method for displaying information about a plurality of content files in a display area by displaying display information items associated with the content files, the method comprising:
   (a) retrieving from a recording medium information regarding a plurality of content files, the information for each content file comprising a data structure storing additional data about the content file, the additional data comprising an identifier for a file and information identifying at least one display information item associated with the content file;
   (b) displaying, on a display unit, a plurality of display information items each associated with one of the plurality of content files and an indicator for indicating that one of the display information items is currently selected in the display area, at least two of the display information items being associated with a first content file, a first display information item of the plurality of display information items being a text information item associated with the first content file and a second display information item of the plurality of display information items being an image information item associated with the first content file, wherein the additional data of the data storing that stores additional data for the first content file identifies the text information item and the image information item;

(c) receiving, from an operation unit, an instruction for updating a current selection of the indicator;

(d) determining whether the indicator selects a display information item of the plurality of display information items displayed on the display unit;

(e) determining a relationship between a selected display information item and at least one other display information item that is associated with a same content file of the plurality of content files as the selected display information item on the basis of the determination result in step (d), the determining of act (e) comprising accessing the additional data of the data structure for the content file corresponding to the selected display information item to determine whether there is at least one other display information item associated with the content file and, when there is at least one other display information item associated with the content file, identifying the at least one other display information item from the additional data for the content file; and (f) when there is at least one other display information item associated with the same content file as the selected display information item, displaying an image object indicating the relationship between the selected display information item and the at least one other display information item determined to have the relationship with the selected display information item on the basis of the determination result in step (e).

* * * * *